United States Patent
Tokuda et al.

(10) Patent No.: US 12,320,005 B2
(45) Date of Patent: Jun. 3, 2025

(54) HOT-DIP PLATED STEEL MATERIAL

(71) Applicant: NIPPON STEEL CORPORATION, Tokyo (JP)

(72) Inventors: Kohei Tokuda, Tokyo (JP); Mamoru Saito, Tokyo (JP); Yasuto Goto, Tokyo (JP); Fumiaki Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/838,856

(22) PCT Filed: Feb. 21, 2023

(86) PCT No.: PCT/JP2023/006113
§ 371 (c)(1),
(2) Date: Aug. 15, 2024

(87) PCT Pub. No.: WO2023/157974
PCT Pub. Date: Aug. 24, 2023

(65) Prior Publication Data
US 2025/0109474 A1    Apr. 3, 2025

(30) Foreign Application Priority Data
Feb. 21, 2022  (JP) .................. 2022-024940

(51) Int. Cl.
*C23C 2/06*    (2006.01)
*B32B 15/01*   (2006.01)
(Continued)

(52) U.S. Cl.
CPC .............. *C23C 2/06* (2013.01); *B32B 15/012* (2013.01); *B32B 15/013* (2013.01); *C22C 18/04* (2013.01); *C23C 2/28* (2013.01); *C23C 2/40* (2013.01)

(58) Field of Classification Search
None
See application file for complete search history.

(56) References Cited

U.S. PATENT DOCUMENTS 10,982,303 B2 *  4/2021  Tokuda ................... C22C 38/00
11,236,409 B2 *  2/2022  Mitsunobu ............ C23C 28/023
(Continued)

FOREIGN PATENT DOCUMENTS

JP    61-201767 A    9/1986
JP    2-85346 A      3/1990
(Continued)

*Primary Examiner* — Daniel J. Schleis
(74) *Attorney, Agent, or Firm* — Birch, Stewart, Kolasch & Birch, LLP

(57) ABSTRACT

A hot-dip plated steel material has a plating layer on a surface of a steel material, in which the plating layer contains Al: more than 22.5% and 50.0% or less, Mg: more than 3.0% and 15.0% or less, Ca: 0.03 to 0.6%, Si: 0.03 to 1.0%, Fe: 2 to 25%, and a remainder consisting of Zn and impurities, and, in an X-ray diffraction pattern of a surface of the plating layer, measured under conditions in which an X-ray output is a voltage of 50 kV and a current of 300 mA using a Cu-Kα ray, $I_1$ obtained from an X-ray diffraction peak of $Al_{0.5}Fe_{1.5}$ is 1.1 or more, and $I_2$ obtained from X-ray diffraction peaks of Zn, Al, and $MgZn_2$ is 0.25 or less.

4 Claims, 2 Drawing Sheets

(51) Int. Cl.
*C22C 18/04* (2006.01)
*C23C 2/28* (2006.01)
*C23C 2/40* (2006.01)

(56) References Cited

U.S. PATENT DOCUMENTS

| | | | | |
|---|---|---|---|---|
| 11,555,235 B2* | 1/2023 | Tokuda | ...................... | C23C 2/02 |
| 12,043,900 B2* | 7/2024 | Tokuda | ...................... | C23C 2/28 |
| 2023/0407428 A1* | 12/2023 | Tabata | ...................... | C22C 38/28 |

FOREIGN PATENT DOCUMENTS

| JP | 7-207421 A | 8/1995 |
|---|---|---|
| JP | 7-216525 A | 8/1995 |
| JP | 11-189857 A | 7/1999 |
| JP | 2010-70810 A | 4/2010 |
| JP | 2021-4403 A | 1/2021 |

\* cited by examiner

HOT-DIP PLATED STEEL MATERIAL

TECHNICAL FIELD OF THE INVENTION

The present invention relates to a hot-dip plated steel material.

The present application claims priority based on Japanese Patent Application No. 2022-024940 filed in Japan on Feb. 21, 2022, the contents of which are incorporated herein by reference.

BACKGROUND ART

A plated steel material is classified into a post-plating product and a pre-plating product depending on a difference in manufacturing method. The post-plating product is manufactured by a method in which a steel sheet is processed into a steel material having a predetermined shape, and then the steel material is immersed in a hot-dip galvanizing bath (post-galvanized method). On the other hand, the pre-plating product is manufactured by continuously immersing a steel sheet in a hot-dip plating bath to form a hot-dip plated steel sheet, and then processing the hot-dip plated steel sheet into a predetermined shape. In JIS H 8641: 2007 defines the type, symbol, plating quality, external appearance, and adhesion amount for the post-plating product. For example, the adhesion amount of plating of the symbol HDZ35 is defined as 350 g/m$^2$ or more, and the deposition amount of plating of the symbol HDZ55 is defined as 550 g/m$^2$ or more.

Such a plated steel material is used in various fields, and is particularly used in water as a severe corrosive environment. As a use application of such a plated steel material, for example, a water passage formed of steel, a water collection trough, and the like are assumed. According to "Regarding galvanizing" on the homepage of Japan Galvanizers Association Inc., a corrosion rate of zinc in water reaches 30 to 100 g/m$^2$. This means that even a post-plating product corresponding to the symbol HDZ35 to HDZ55 having a relatively large plating thickness ends a lifetime of a plating layer in three to five years at the earliest.

Therefore, in an application in an underwater environment or an application where water wetting may occur, the thickness of plating needs to be large, and for such an application, a post-plating product manufactured by a post-galvanized method is often used. By the way, in a general galvanized layer, Zn in the galvanized layer is ionized and gradually eluted into water in a water immersion environment. When a Zn phase (i phase) on a surface of the galvanized layer disappears, an interface alloy layer (Zn—Fe alloy layer) at an interface between the plating layer and a steel material corrodes. When the interface alloy layer further continues to corrode, corrosion of a base metal proceeds. For this reason, conventionally, it has been studied to increase a lifetime of the plating layer by enhancing corrosion resistance of the Zn phase on the surface layer of the plating layer and the interface alloy layer. For example, Patent Document 1 is an example in which a Zn—Al—Mg plating layer is applied instead of the Zn phase of the plating surface layer, and Patent Document 2 is an example in which corrosion resistance is enhanced by further adding an alloying element to the Zn phase. However, if corrosion resistance in water or under an environment in which wetting with water occurs can be further improved, the post-plating product can be expected to be widely adopted as a plated steel material used in ponds, rivers, coasts, and the like.

CITATION LIST

Patent Document

Patent Document 1: Japanese Unexamined Patent Application, First Publication No. 2010-070810
Patent Document 2: Japanese Unexamined Patent Application, First Publication No. 2021-004403

SUMMARY OF INVENTION

Problems to be Solved by the Invention

The present invention has been made in view of the above circumstances, and an object of the present invention is to provide a hot-dip plated steel material capable of exhibiting high corrosion resistance in water or under a constant water wetted environment in which water wetting may occur.

Means for Solving the Problem

In order to solve the above problem, the present invention adopts the following configurations.

[1] A hot-dip plated steel material that is a plated steel material having a plating layer on a surface of a steel material, in which the plating layer has an average chemical composition including, in mass %,
Al: more than 22.5% and 50.0% or less,
Mg: more than 3.0% and 15.0% or less,
Sn: 0% or more and 0.7% or less,
Bi: 0% or more and 0.3% or less,
In: 0% or more and 0.3% or less,
Ca: 0.03% or more and 0.6% or less
Y: 0% or more and 0.30% or less,
La: 0% or more and 0.30% or less,
Ce: 0% or more and 0.30% or less,
Si: 0.03% or more and 1.0% or less,
Cr: 0% or more and 0.25% or less,
Ti: 0% or more and 0.25% or less,
Ni: 0% or more and 0.25% or less,
Co: 0% or more and 0.25% or less,
V: 0% or more and 0.25% or less,
Nb: 0% or more and 0.25% or less,
Cu: 0% or more and 0.25% or less,
Mn: 0% or more and 0.25% or less,
Fe: 2.0% or more and 25% or less,
Sr: 0% or more and 0.50% or less,
Sb: 0% or more and 0.50% or less,
Pb: 0% or more and 0.50% or less,
B: 0% or more and 0.50% or less,
Li: 0% or more and 0.50% or less,
Zr: 0% or more and 0.50% or less,
Mo: 0% or more and 0.50% or less,
W: 0% or more and 0.50% or less,
Ag: 0% or more and 0.50% or less,
P: 0% or more and 0.50% or less, and
a remainder consisting of Zn and impurities,
the total amount $\Sigma A$ of Sn, Bi, and In is 0% or more and 0.7% or less,
the total amount $\Sigma B$ of Ca, Y, La, and Ce is 0.03% or more and 0.60% or less,
the total amount $\Sigma C$ of Cr, Ti, Ni, Co, V, Nb, Cu, and Mn is 0% or more and 0.25% or less,
the total amount $\Sigma D$ of Sr, Sb, Pb, B, Li, Zr, Mo, W, Ag, and P is 0% or more and 0.50% or less,
the following formulas (1) to (3) are satisfied, in an X-ray diffraction pattern of a surface of the plating layer, measured under conditions of an X-ray output of 50 kV and 300 mA using a Cu-Kα ray, when $I_1$ obtained from an X-ray diffraction peak of $Al_{0.5}Fe_{1.5}$ is defined by formula (A-1), formula (A-2) is satisfied, and when $I_2$ obtained from X-ray diffraction peaks of Zn, Al, and $MgZn_2$ is defined by formula (B-1), formula (B-2) is satisfied.

$$Sn \leq Si \quad (1)$$

$$15 \leq Mg/Si \quad (2)$$

$$1.0 \leq Si/Ca \leq 5.0 \quad (3)$$

[Mathematical Formula 1]

$$I_1 = \frac{I\max(43.45 \sim 44.45°)}{I(43.45) + 0.5\{|I(43.45°) - I(44.45°)|\}} \quad (A\text{-}1)$$

$$1.10 \leq I_1 \quad (A\text{-}2)$$

$$I_2 = \frac{I\max(36.00 \sim 36.60°)}{I\max(36.00 \sim 36.60°) + I\max(38.00 \sim 39.00°) + I\max(19.20 \sim 20.00°)} \quad (B\text{-}1)$$

$$I_2 \leq 0.25 \quad (B\text{-}2)$$

Note that, in formulas (1) to (3), Sn, Si, Mg, and Ca represent the contents (mass %) of the respective elements in the plating layer, Imax (k to m°) in formulas (A-1) and (B-1) represents an absolute maximum value of an X-ray diffraction intensity between a diffraction angle of k° and a diffraction angle of m°, Imax (n°) in formula (A-1) represents an X-ray diffraction intensity at a diffraction angle of n°, and k, m, and n each represent a diffraction angle indicated in formulas (A-1) and (B-1).

[2] The hot-dip plated steel material according to [1], in which in an X-ray diffraction pattern of a surface of the plating layer, measured under conditions of an X-ray output of 50 kV and 300 mA using a Cu-Kα ray, when $I_3$ obtained from an X-ray diffraction peak of $MgZn_2$ is defined by formula (C-1), formula (C-2) is satisfied.

[Mathematical Formula 2]

$$I_3 = \frac{I\max(28.52 \sim 28.92°)}{\{I\max(19.20 \sim 20.00°) + I\max(20.58 \sim 20.98°) + I\max(22.06 \sim 22.46°) + I\max(28.52 \sim 28.92°)\}} \quad (C\text{-}1)$$

$$I_3 \leq 0.03 \quad (C\text{-}2)$$

Note that Imax (k to m°) in formula (C-1) represents an absolute maximum value of an X-ray diffraction intensity between a diffraction angle of k° and a diffraction angle of m°, and k and m each represent a diffraction angle indicated in formula (C-1).

[3] The hot-dip plated steel material according to [1] or [2], in which in an X-ray diffraction pattern of a surface of the plating layer, measured under conditions of an X-ray output of 50 kV and 300 mA using a Cu-Kα ray, when $I_4$ obtained from an X-ray diffraction peak of $Ca(Al_2Si_2)O_8$ is defined by formula (D-1), formula (D-2) is satisfied.

[Mathematical Formula 3]

$$I_4 = \frac{I\max(22.91 \sim 23.91°)}{I(22.91°) + 0.5\{|I(22.91°) - I(23.91°)|\}} \quad (D\text{-}1)$$

$$1.1 \leq I_4 \quad (D\text{-}2)$$

Note that Imax (k to m°) in formula (D-1) represents an absolute maximum value of an X-ray diffraction intensity between a diffraction angle of k° and a diffraction angle of m°, Imax (n°) represents an X-ray diffraction intensity at a diffraction angle of n°, and k, m, and n each represent a diffraction angle indicated in formula (D-1).

Effects of the Invention

The present invention can provide a hot-dip plated steel material capable of exhibiting high corrosion resistance in water (in simulated acid rain or salt water such as seawater) or under a constant water wetted environment in which water wetting may occur. Note that, in the following description, "in simulated acid rain" may be referred to as in water having a relatively low salt concentration, and "seawater (salt water)" may be referred to as in water having a relatively high salt concentration.

EMBODIMENT OF THE INVENTION

Figure 1:
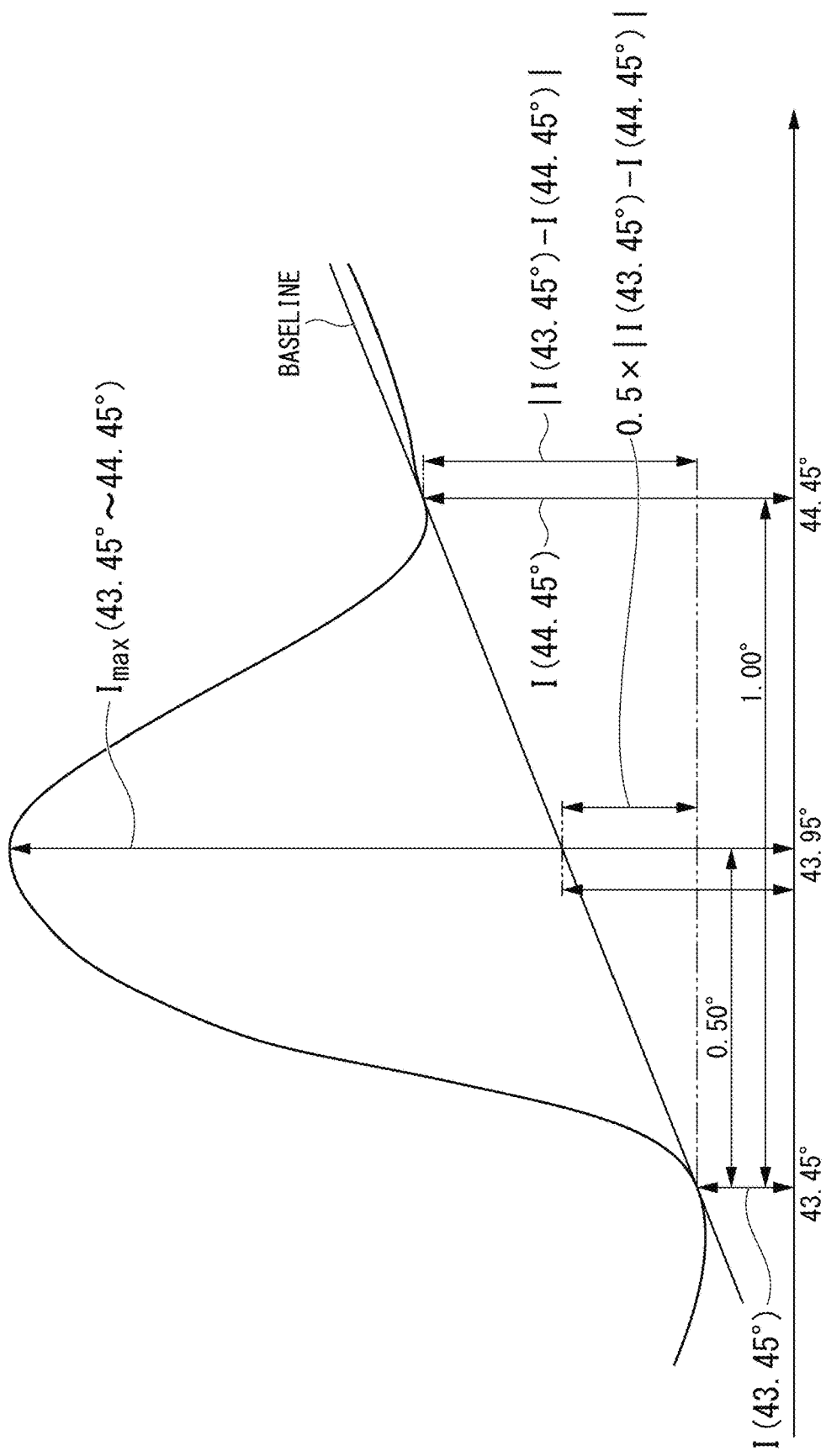
FIG. 1 is a schematic diagram for explaining formula (A-1).

The present inventors have intensively studied a hot-dip plated steel material including a plating layer containing Al, Mg, and Zn and manufactured by a dipping-type hot-dip galvanizing method in order to improve corrosion resistance under a constant water wetted environment.

As a result of intensive studies to optimize corrosion resistance in water and in a water wetting application, the present inventors have found a plating structure and a containing substance of post-plating that is most unlikely to corrode during water wetting. In the present invention, corrosion resistance of a plating layer in water wetting can be sufficiently enhanced, and a reduction in life cycle cost of a hot-dip plated steel material can contribute to industrial development.

When Zn is contained in the plating layer, a Zn phase may be formed in a microstructure of the plating layer. Since the Zn phase is likely to be corroded in water and the corrosion proceeds until the Zn phase disappears, the Zn phase should not be used as a main phase of the plating layer. Various intermetallic compound phases are observed in a plating layer containing Al, Mg, and Zn, and in the present invention, the chemical composition thereof is adjusted, and particularly the amount of Al is increased in order to limit the phase amount of the Zn phase.

When the amount of Al is increased, a large amount of Al phase is formed in a microstructure of the plating layer. In water having a relatively low salt concentration, such as soft water, hard water, or acid rain, the Al phase is excellent in corrosion resistance, and therefore Al may be contained in the plating layer. A reason why the Al phase is excellent in water resistance is considered to be that an alumina coating such as $Al_2O_3$ is formed on a surface of Al.

In addition, the present inventors have found that, in a method in which a two-stage plating method and a post-galvanized method are used in combination (hereinafter, referred to as a dipping two-stage plating method), that is, a method in which a plating original sheet made of a Zn-based plated steel material is immersed in a hot-dip plating bath and then pulled up, it is possible to obtain a relatively thick plating layer as compared with a case where post-galvanizing is performed using a steel material having no plating layer as a plating original sheet. For example, when post-galvanizing is performed using, as a plating original sheet, an alloyed Zn-based plated steel material having an interface alloy layer between a plating layer and a base metal, a new hot-dip plating layer is formed on the interface alloy layer of the plating original sheet, and the thickness of the entire plating layer containing the interface alloy layer can be increased. Therefore, in order to improve corrosion resistance under a constant water wetted environment, the present inventors studied a structure of an interface alloy layer which is hardly eluted into water, and as a result, have found that $(AlFe_3)_{0.5}$ (hereinafter, denoted by $Al_{0.5}Fe_{1.5}$) has a structure in which a potential difference between a surrounding plating layer and a base metal is small and which is most hardly eluted, and exhibits high corrosion resistance.

On the other hand, in seawater or the like containing salt, Al is easily corroded, and therefore the content of Al has to be limited. In order to improve corrosion resistance to seawater or the like while keeping the large amount of Al, it is preferable to increase a ratio of a substance having a complicated crystal structure, such as an intermetallic compound, and for example, a plating layer preferably contains a large amount of $MgZn_2$ phase. Note that, in a case where the plating layer contains a large amount of $MgZn_2$ phase, it is necessary to reduce the amount of $MgZn_2$ phase having a specific plane orientation as contained in a ternary eutectic structure and to largely grow $MgZn_2$ phase having coarse grains (for example, a grain size of more than 3 μm). This is because most of the $MgZn_2$ phase present in a ternary eutectic structure together with a Zn phase, an Al phase, and the like is likely to corrode. A reason for this is considered to be that coupling reaction due to a surrounding microstructure is active and a specific orientation of the $MgZn_2$ phase is present in the ternary eutectic structure. By limiting the amount of $MgZn_2$ phase having a specific plane orientation as contained in the ternary eutectic structure, extremely high corrosion resistance can be exhibited even in seawater.

Furthermore, in order to improve corrosion resistance of the plating layer, it is more preferable to form an oxide film having a high barrier property on a surface of the plating layer. The present inventors have found that an oxide suitable for this barrier property is $Ca(Al_2Si_2)O_8$, and formation of $Ca(Al_2Si_2)O_8$ on the surface can significantly improve water wetting corrosion resistance.

In addition, in the dipping two-stage plating method, when a plating original sheet having an interface alloy layer is used and a Zn—Al—Mg-based plating bath containing a large amount of Al is used as a second-stage hot-dip plating bath, iron contained in the interface alloy layer of the plating original sheet reacts with Al in the plating bath to generate an Fe—Al-based compound, and a new interface alloy layer containing the Fe—Al-based compound is formed between a steel material and a new plating layer. At this time, the Fe—Al-based compound to be newly formed needs to be $Al_{0.5}Fe_{1.5}$. The present inventors made intensive studies, and as a result, have found that, in order to form an interface alloy layer containing $Al_{0.5}Fe_{1.5}$, it is necessary to optimize an interface alloy layer contained in a plating original sheet and to optimize immersion conditions in a plating bath.

The present invention has been made on the basis of the above-described findings. Hereinafter, a plated steel sheet according to an embodiment of the present invention will be described.

A hot-dip plated steel material according to an embodiment of the present invention is a plated steel material having a plating layer on a surface of a steel material, in which the plating layer has an average chemical composition including, in mass %, Al: more than 22.5% and 50.0% or less,
Mg: more than 3.0% and 15.0% or less,
Sn: 0% or more and 0.7% or less,
Bi: 0% or more and 0.3% or less,
In: 0% or more and 0.3% or less,
Ca: 0.03% or more and 0.6% or less
Y: 0% or more and 0.30% or less,
La: 0% or more and 0.30% or less,
Ce: 0% or more and 0.30% or less,
Si: 0.03% or more and 1.0% or less,
Cr: 0% or more and 0.25% or less,
Ti: 0% or more and 0.25% or less,
Ni: 0% or more and 0.25% or less,
Co: 0% or more and 0.25% or less,
V: 0% or more and 0.25% or less,
Nb: 0% or more and 0.25% or less,
Cu: 0% or more and 0.25% or less,
Mn: 0% or more and 0.25% or less,
Fe: 2.0% or more and 25% or less,
Sr: 0% or more and 0.50% or less,
Sb: 0% or more and 0.50% or less,
Pb: 0% or more and 0.50% or less,
B: 0% or more and 0.50% or less,
Li: 0% or more and 0.50% or less,
Zr: 0% or more and 0.50% or less,
Mo: 0% or more and 0.50% or less,
W: 0% or more and 0.50% or less,
Ag: 0% or more and 0.50% or less,
P: 0% or more and 0.50% or less, and
a remainder consisting of Zn and impurities,
the total amount ΣA of Sn, Bi, and In is 0% or more and 0.7% or less,
the total amount ΣB of Ca, Y, La, and Ce is 0.03% or more and 0.60% or less,
the total amount ΣC of Cr, Ti, Ni, Co, V, Nb, Cu, and Mn is 0% or more and 0.25% or less,
the total amount ΣD of Sr, Sb, Pb, B, Li, Zr, Mo, W, Ag, and P is 0% or more and 0.50% or less,
the following formulas (1) to (3) are satisfied,
in an X-ray diffraction pattern of a surface of the plating layer, measured under conditions in which an X-ray output is a voltage of 50 kV and a current of 300 mA using a Cu-Kα ray, when $I_1$ obtained from an X-ray diffraction peak of $Al_{0.5}Fe_{1.5}$ is defined by formula (A-1), formula (A-2) is satisfied, and
when $I_2$ obtained from X-ray diffraction peaks of Zn, Al, and $MgZn_2$ is defined by formula (B-1), formula (B-2) is satisfied.

$$Sn \leq Si \tag{1}$$

$$15 \leq Mg/Si \tag{2}$$

$$1.0 \leq Si/Ca \leq 5.0 \tag{3}$$

[Mathematical Formula 4]

$$I_1 = \frac{I\max(43.45 \sim 44.45°)}{I(43.45) + 0.5\{|I(43.45°) - I(44.45°)|\}} \quad \text{(A-1)}$$

$$1.10 \leq I_1 \quad \text{(A-2)}$$

$$I_2 = \frac{I\max(36.00 \sim 36.60°)}{I\max(36.00 \sim 36.60°) + I\max(38.00 \sim 39.00°) + I\max(19.20 \sim 20.00°)} \quad \text{(B-1)}$$

$$I_2 \leq 0.25 \quad \text{(B-2)}$$

Note that, in formulas (1) to (3), Sn, Si, Mg, and Ca represent the contents (mass %) of the respective elements in the plating layer, Imax (k to m°) in formulas (A-1) and (B-1) represents an absolute maximum value of an X-ray diffraction intensity between a diffraction angle of k° and a diffraction angle of m°, Imax (n°) in formula (A-1) represents an X-ray diffraction intensity at a diffraction angle of n°, and k, m, and n each represent a diffraction angle indicated in formulas (A-1) and (B-1).

In the following description, the expression "%" of the content of each element in a chemical composition means "mass %". In addition, a numerical range represented by "to" means a range including numerical values described before and after "to" as the lower limit and the upper limit. In addition, a numerical range in which "more than" or "less than" is attached to numerical values described before and after "to" means a range not including these numerical values as the lower limit or the upper limit.

The "corrosion resistance" indicates a property that a plating layer itself is hardly corroded. A Zn-based plating layer has a sacrificial corrosion protection action on a steel material. Therefore, in a corrosion process of a plated steel sheet, the Zn-based plating layer corrodes and turns into white rust before the steel material corrodes, the plating layer that has turned into white rust disappears, and then the steel material corrodes to generate red rust.

A steel material to be plated will be described.

A material of the steel material is a steel sheet. The size of the steel sheet is not particularly limited. Any steel sheet may be used as long as it is a steel sheet used as a plating original sheet in an ordinary hot-dip galvanizing step, and is a steel sheet capable of solidifying a plating layer on a surface by being immersed in a molten metal, for example, through a continuous hot-dip galvanizing line (CGL) or a batch-type dipping galvanizing step. Steel materials having various shapes can be obtained by subjecting such a steel sheet to various processing (including welding) singly or in combination of a plurality of the steel sheets. The shape of the steel material is not particularly limited due to the nature of the post-galvanized method applied in the present embodiment, and a steel material obtained by processing a steel sheet or a steel material obtained by welding and joining steel sheets may be used.

A material of the steel sheet that is a material of the steel material is not particularly limited. For example, various steel sheets such as a general steel, an Al-killed steel, an ultra low carbon steel, a high carbon steel, various high tensile strength steels, and some high alloy steels (a steel containing a corrosion resistance reinforcing element such as Ni or Cr) are applicable. In addition, as for the steel sheet, conditions for a method for manufacturing the steel sheet (a blast furnace material or an electric furnace material), a method for manufacturing the steel sheet (a hot rolling method, a pickling method, a cold rolling method, or the like), and the like are not particularly limited.

Note that, as will be described later, it is preferable to use, as an example, a plated steel material in which a hot-dip galvanized layer is formed in advance on a surface of the above-described steel material (for example, JIS H 8641: 2007) as a plating original sheet of the present embodiment. In order to form a plating layer included in the hot-dip plated steel material of the present embodiment, it is necessary to use a plated steel material as the plating original sheet, and the plating layer of the plated steel material needs to contain a Zn—Fe alloy layer (interface alloy layer) having a thickness in a specific range.

Next, the plating layer included in the hot-dip plated steel material of the present embodiment will be described. A main body of the plating layer according to the present embodiment is divided into a Zn—Al—Mg-based alloy layer on a surface layer side and an Al—Fe alloy layer (interface alloy layer) present at an interface with a base metal. The plating layer may contain an oxide film containing oxygen and having an indefinite thickness, formed on the Zn—Al—Mg-based alloy layer.

The Zn—Al—Mg-based alloy layer is made of a Zn—Al—Mg-based alloy. The Zn—Al—Mg-based alloy means a ternary alloy containing Zn, Al, and Mg. The Zn—Al—Mg-based alloy layer is located away from the base metal (steel material). The Zn—Al—Mg-based alloy layer is formed in such a manner that a portion that was a Zn layer or a Zn alloy layer in a plating original sheet was dissolved in a plating bath during post-galvanizing and then replaced with a molten metal in the plating bath. Therefore, the Zn—Al—Mg-based alloy layer is an alloy layer having substantially the same components as the plating bath, is excellent in corrosion resistance, and is also rich in sacrificial corrosion resistance because the Zn—Al—Mg-based alloy layer contains a large amount of Zn and Mg components.

The Al—Fe alloy layer is an interface alloy layer between the steel material and the Zn—Al—Mg alloy layer. Since the Al—Fe alloy layer is present on a base metal side, Fe is diffused from the base metal side when the plating original sheet is subjected to post-galvanizing. Therefore, the Al—Fe alloy layer is a layer containing both Al in the plating bath and Fe diffused from the base metal during plating. When a cross section of the Al—Fe alloy layer is actually enlarged, there is a mixed phase of an aggregate of an AlFe-based intermetallic compound present in a rod shape and a constituent phase contained in the Zn—Al—Mg alloy layer of the surface layer.

In addition, the Al—Fe alloy layer is also a layer formed by reaction of a portion that was the interface alloy layer (the above-described Zn—Fe alloy layer) included in the plating original sheet and made of a Zn—Fe alloy with Al in the plating bath for post-galvanizing when the plating original sheet is subjected to post-galvanizing, and exhibits extremely high corrosion resistance in an underwater environment (simulated acid rain and seawater (salt water)).

The Al—Fe alloy layer of the hot-dip plated steel material is formed on a surface of the steel material (specifically, between the steel material and the Zn—Al—Mg alloy layer), and the Al—Fe alloy layer is formed by mutual atomic diffusion between the base metal (steel material) and the plating bath. When a hot-dip plating method is used as a manufacturing method, the Al—Fe alloy layer is easily formed in a plating layer containing an Al element. The Al—Fe alloy layer according to the present embodiment contains $Al_{0.5}Fe_{1.5}$. $Al_{0.5}Fe_{1.5}$ will be described later.

The plating layer according to the present embodiment contains Si. Si is particularly easily incorporated into the Al—Fe alloy layer, and an Al—Fe—Si intermetallic compound phase may be formed. This intermetallic compound is an intermetallic compound formed with a thickness of less than 1 μm between the base metal (steel material) and the Al—Fe alloy layer during post-galvanizing of the plating original sheet. An intermetallic compound phase to be identified is, for example, an AlFeSi phase, and α, β, q1, q2-AlFeSi phases and the like exist as isomers. Therefore, these AlFeSi phases and the like may be detected in the Al—Fe alloy layer.

In general, an oxide film containing an oxide of a constituent element of the plating layer may be formed on an outermost surface of the plating layer. In the present embodiment, an oxide film having a thickness of 10 μm or less or less than 1 μm may be partially formed. Usually, an element contained in the plating layer is bonded to oxygen on a surface of the plating layer. When the plating layer according to the present embodiment includes an oxide film, a bond such as Zn—O, Mg—O, Al—O, Si—O, or Ca—O, or a bond such as Mg—Al—O, Al—Si—O, or Ca—Al—Si—O is confirmed by surface analysis such as X-ray spectroscopy (XPS). Such an oxide film is a useful coating in order to ensure high corrosion resistance in water (simulated acid rain and seawater (salt water)).

Since the thickness of the entire plating layer depends on plating conditions and shape, the upper limit and the lower limit of the thickness of the entire plating layer are not particularly limited. For example, as the thickness of one surface, the thickness of the entire plating layer may be about 50 to 120 μm. The thicknesses of the Al—Fe alloy layer and the Zn—Al—Mg alloy layer are not particularly limited, but for example, the thickness of the Al—Fe alloy layer may be 10 to 100 μm, and may account for 20% to 80% of the total thickness of the plating layer. In addition, the Zn—Al—Mg alloy layer on the interface alloy layer may account for at least 20% of the entire thickness, and the thickness of the Zn—Al—Mg alloy layer may be, for example, 15 to 100 μm. Note that this thickness is the general thickness of a flat portion of the plated steel sheet, and for example, a portion having a complicated shape, such as an end surface portion or a corner portion, may partially have a thickness of about 1 mm because plating sag or accumulation is formed.

Next, the average chemical composition of the plating layer will be described. The average chemical composition of the entire plating layer is an average chemical composition of the total of the Al—Fe alloy layer and the Zn—Al—Mg alloy layer.

When post-galvanizing is performed using a Zn-based plated steel material as a plating original sheet, the chemical composition of the Zn—Al—Mg alloy layer finally adhering to a surface of the steel material is almost the same as that of a plating bath. This is because the Zn-based plating layer of the plating original sheet hardly remains except for the interface alloy layer, and the plating bath amount of post-galvanizing is overwhelmingly larger than the adhesion amount of the Zn-based plating layer of the plating original sheet.

On the other hand, the Al—Fe alloy layer is obtained by change of the interface alloy layer containing the Zn—Fe alloy phase included in the plating original sheet to an Al—Fe alloy layer by reaction during post-galvanizing. Therefore, an Al concentration and an Fe concentration of the Al—Fe alloy layer tend to be higher than those of a plating bath composition in post-galvanizing. On the other hand, a Zn concentration of the Al—Fe alloy layer may be higher than that of the plating bath composition in post-galvanizing because Zn in the Zn—Fe alloy phase included in the plating original sheet may slightly remain. Concentrations of the other components may be lower than those of the plating bath composition in post-galvanizing.

On the other hand, in view of the alloy layer portion of the present invention, a component proportion concentration between elements from which Fe has been removed substantially coincides with that of plating bath components.

Hereinafter, elements contained in the plating layer will be described. These components are preconditions for exerting predetermined plating structure and performance of the present invention, and it is difficult to manufacture the plating layer of the present embodiment outside this range.

Al: More than 22.5% and 50.0% or Less

Al is an element mainly constituting the plating layer. In the Zn—Al—Mg-based plating, Al mainly forms an Al phase in the plating layer. When the Al content is 22.5% or less, a Zn phase and a ternary eutectic structure (Zn/Al/$MgZn_2$ ternary eutectic structure containing a Zn phase, an Al phase, and a $MgZn_2$ phase) containing the Zn phase are formed in a solidification process of the plating layer. The Zn phase has low corrosion resistance in water (simulated acid rain and seawater (salt water)), and the same applies to the Zn phase contained in the ternary eutectic structure. Therefore, the Al content is more than 22.5% in order to prevent crystallization of the Zn phase and the ternary eutectic structure as much as possible. On the other hand, when the Al content exceeds 50.0%, the melting point of the plating bath rises, and as a result, growth of the Al—Fe alloy layer is active, reaction for forming the Al—Fe alloy layer is not stabilized, a large amount of Fe is contained in the plating layer, a desired Al—Fe alloy layer cannot be obtained, and performance of the plating layer is impaired. Therefore, the Al content is 50.0% or less.

In addition, the Al content largely affects the structure of the Al—Fe alloy layer. Although details will be described later, when the Al content is more than 35.0%, the amount of the Zn phase in the plating layer decreases, and corrosion resistance in water (simulated acidic rain and salt water) can be further enhanced. Therefore, the Al content is preferably more than 35.0%.

Mg: More than 3.0% and 15.0% or Less

Similarly to Al and Zn, Mg is an element mainly constituting the plating layer. When the amount of Mg is insufficient, corrosion resistance in salt-containing water tends to be low, and therefore the Mg content is more than 3.0%. On the other hand, when the Mg content is more than 15.0%, there is a problem in soundness of the plating layer, and it is difficult to ensure corrosion resistance in water (simulated acid rain and seawater (salt water)). Therefore, the Mg content is 15.0% or less.

In addition, since Mg hardly reacts with Fe, in a distribution of Mg in the thickness direction of the plating layer, a Mg concentration tends to be low near an interface with the base metal or near the Al—Fe alloy layer, and the Mg concentration tends to be high in a surface layer of the plating layer. When the Mg content in the plating layer is more than 5.0%, the amount of the Zn phase in the plating layer decreases, and corrosion resistance in water (simulated acidic rain and salt water) can be further enhanced. Therefore, the Mg content is preferably more than 5.0%.

Element Group A

Sn: 0% or more and 0.7% or less

Bi: 0% or more and 0.3% or less

In: 0% or more and 0.3% or less

Total amount ΣA of Sn, Bi, and In: 0% or more and 0.7% or less

Since each element of the element group A (Sn, Bi, and In) is an element that can be optionally contained, the content of each element is 0% or more. When Sn is contained, Mg$_9$Sn$_5$ tends to be formed in the plating layer. Bi forms Mg$_3$Bi$_2$, and In forms Mg$_3$In, for example. This improves corrosion resistance in salt water.

When these elements are contained in a small amount, an influence on corrosion resistance in water (simulated acid rain and seawater (salt water)) is small, but when these elements are excessively contained, the corrosion resistance in simulated acid rain and salt water is extremely deteriorated, and therefore it is necessary to limit upper limits of the contents of these elements. Since any element exhibits similar action and effect, it is necessary to control the total amount of these elements as the element group A. The total amount of the element group A needs to be 0.7% or less.

Note that these elements do not affect reaction of the interface alloy layer, but tend to be bonded to Mg. Therefore, concentrations of these elements tend to be slightly high in the surface layer, and these elements exhibit a component distribution similar to Mg.

Element Group B
Ca: 0.03 to 0.6%
Y: 0 to 0.30%
La: 0 to 0.30%
Ce: 0 to 0.30%
Total amount ΣB of Ca, Y, La, and Ce: 0.03% or more and 0.60% or less These elements are elements necessary for controlling a reaction rate of the plating layer together with Si in post-galvanizing on the plating original sheet, and elements necessary for controlling Fe diffusion in the plating bath. Furthermore, reaction of forming an intermetallic compound containing these elements between the base metal and the interface alloy layer is necessary for ensuring adhesion between the base metal and the Al—Fe alloy layer. Without an element of the element group B (particularly Ca), plating adhesion and a plating composition distribution cannot be controlled.

When Ca is contained in the plating layer, a needle-like Al—Ca—Si-based compound may be accumulated and formed near the base metal. This generates an anchor effect between the base metal and the Al—Fe alloy layer, thereby forming a plating layer excellent in adhesion. This Al—Ca—Si-based compound is formed only when Si and Ca are in a specific component range. Therefore, in order to ensure corrosion resistance in water (simulated acid rain and seawater (salt water)), it is necessary to form the Al—Ca—Si-based compound near an interface between the base metal and the Al—Fe alloy layer. In particular, Ca tends to be bonded to Si, and the Al—Ca—Si-based compound tends to be formed when a component range of 1.0≤Si/Ca≤5.0 is satisfied.

When the Ca content is relatively high, Al$_{2.15}$Zn$_{1.85}$Ca and the like are also formed in addition to the Al—Ca—Si-based compound. These compounds have high corrosion resistance to simulated acid rain and salt water. Since these compounds are bonded to, particularly Si and formed around the interface alloy layer near the base metal, it is presumed that these compounds contribute to corrosion resistance of the base metal near the interface in water (simulated acid rain and seawater (salt water)) while ensuring plating adhesion. Note that, adjustment of formation of these compounds near the interface has a close relation with a method for manufacturing the hot-dip plated steel material of the present embodiment. As a premise to ensure corrosion resistance in water (simulated acid rain and seawater (salt water)), it is necessary to strictly control component proportions of Ca and Si. From the above, the Ca content is 0.03% to 0.6%.

When the plating layer contains Ca, a Ca—Al—Si—O oxide film containing Ca can be formed on a plating surface.

Elements that play a role similar to that of Ca are Y, La, and Ce. These elements are optional additive elements, and tend to be replaced with a Ca element when contained. Note that, when Ca is not contained, even when Y, La, and Ce are contained, sufficient performance is not exhibited. Y, La, and Ce are each contained in a range of 0.30% or less, thereby forming mutual substituents and functioning similarly to Ca in water (simulated acid rain and seawater (salt water)). However, when the contents of Y, La, and Ce each exceed 0.30%, corrosion resistance in water (simulated acid rain and seawater (salt water)) is extremely deteriorated. Therefore, the contents of Y, La, and Ce are each 0.30% or less.

In addition, even when the total amount of the elements of the element group B is excessive, corrosion resistance in water (simulated acid rain and seawater (salt water)) is deteriorated. Therefore, the total amount ΣB of Ca, Y, La, and Ce is 0.03% or more and 0.60% or less.

Si: 0.03% or More and 1.0% or Less

Si is an element necessary for forming a necessary intermetallic compound in the plating layer. In the present embodiment, the temperature of the plating bath often exceeds 500° C. When the steel sheet is immersed in the plating bath in this temperature range, Al—Fe alloying reaction excessively proceeds, an Fe concentration of the plating layer increases, and corrosion resistance in water (simulated acid rain and seawater (salt water)) tends to be deteriorated. Therefore, the plating layer needs to contain 0.03% or more of Si. When Si is contained in the plating layer, an Al—Ca—Si-based compound is formed, and excessive Al—Fe reaction tends to be suppressed. Note that, as described above, formation of the Al—Ca—Si-based compound has a close relation with a manufacturing method disclosed in the present embodiment. This compound and the like are accumulated near the interface and suppresses Fe diffusion, and a microstructure in the plating layer can form an appropriate microstructure according to a solidification process.

In addition, Si is an element that is extremely easily bonded to Ca, and easily forms various Al—Ca—Si compounds such as CaAlSi, Al$_2$CaSi$_2$, Ca$_2$Al$_4$Si$_3$, and Ca$_2$Al$_3$Si$_4$, each of which has a needle shape. However, the excessive amount of Si impairs corrosion resistance of the plating layer in water (simulated acid rain and seawater (salt water)).

In addition, when the plating layer contains Si, a Ca—Al—Si—O oxide film containing Si can be formed on a plating surface. From the above, the Si content is 0.03 to 1.0%.

Element Group C
Cr: 0% or more and 0.25% or less
Ti: 0% or more and 0.25% or less
Ni: 0% or more and 0.25% or less
Co: 0% or more and 0.25% or less
V: 0% or more and 0.25% or less
Nb: 0% or more and 0.25% or less
Cu: 0% or more and 0.25% or less
Mn: 0% or more and 0.25% or less
Total amount ΣC of Cr, Ti, Ni, Co, V, Nb, Cu, and Mn: 0% or more and 0.25% or less An element of the element group C is a metal element that can be contained in the plating layer, and may be contained therein. These metal elements tend to be replaced with Al, Zn, or the like in the plating layer to move a potential of the plating layer nobler, and corrosion resistance in water (particularly in simulated acid rain) tends to be improved when these metal elements are contained in this concentration range. However, when these elements are excessively contained, an intermetallic compound containing these elements is formed. Therefore, corrosion resistance in water is deteriorated. Therefore, the contents of Cr, Ti, Co, V, Nb, Cu, and Mn are each 0.25% or less. Furthermore, even when the total amount of the elements of the element group C is excessive, corrosion resistance in water is deteriorated. Therefore, the total amount of the elements of the element group C is 0.25% or less.

Fe: 2.0% or More and 25% or Less

Since the hot-dip plated steel material of the present embodiment is manufactured by subjecting the plating original sheet to post-galvanizing, Fe may be diffused into the Zn—Al—Mg alloy layer from the steel material and the interface alloy layer (Fe—Zn-based alloy layer) included in the plating original sheet during post-galvanizing. Therefore, Fe may be contained up to 25% in the entire plating layer, but a change in corrosion resistance due to inclusion of this element has not been confirmed. Therefore, the Fe content of the plating layer is 2.0 to 25%. Note that, in most cases, an Fe concentration in the Zn—Al—Mg alloy layer on a surface layer side of the plating layer is less than 2.0%, and the Fe concentration is close to that of the plating bath components. In addition, the chemical composition of the plating layer excluding Fe substantially coincides with the composition of the plating bath components.

Element Group D

Sr: 0% or more and 0.50% or less
Sb: 0% or more and 0.50% or less
Pb: 0% or more and 0.50% or less
B: 0% or more and 0.50% or less
Li: 0% or more and 0.50% or less
Zr: 0% or more and 0.50% or less
Mo: 0% or more and 0.50% or less
W: 0% or more and 0.50% or less
Ag: 0% or more and 0.50% or less
P: 0% or more and 0.50% or less
Total amount $\Sigma D$ of Sr, Sb, Pb, B, Li, Zr, Mo, W, Ag, and P: 0% or more and 0.50% or less An element of the element group D may be contained in the plating layer. These elements have similar effects to the elements of the element group C described above, and are elements that are relatively more easily contained than the element group C. Therefore, the content of each element of the element group D is 0 to 0.50%. In addition, when the total amount of the elements of the element group D is excessive, corrosion resistance in water (simulated acid rain and seawater (salt water)) is deteriorated. Therefore, the total amount of the elements of the element group D is 0 to 0.50%.

Remainder: Zn and Impurities

The remainder preferably contains Zn. The hot-dip plated steel material of the present embodiment is a highly versatile Zn-based plated steel material, and for example, can impart appropriate sacrificial corrosion resistance to the steel material by containing a certain amount or more of Zn for the purpose of ensuring the sacrificial corrosion resistance. Regarding corrosion resistance in water having a low salt concentration, the Al content is preferably large. However, in water containing a relatively large amount of salt, such as seawater, it is necessary to ensure corrosion resistance by inclusion of a Zn—Mg-based intermetallic compound such as $MgZn_2$ in order to ensure corrosion resistance. Therefore, in order to ensure the required amount of the Zn—Mg-based intermetallic compound, the remainder contains Zn.

The impurity refers to a component that is contained in a raw material or mixed in a manufacturing step and not intentionally contained. For example, in the plating layer, a small amount of component other than Fe may be mixed as the impurity due to mutual atomic diffusion between the steel material (base metal) and the plating bath.

In addition, the plating layer according to the present embodiment needs to satisfy the following formulas (1) to (3). Sn, Si, Mg, and Ca in formulas (1) to (3) represent the contents (mass %) of the respective elements in the plating layer.

$$Sn \leq Si \quad (1)$$

$$15 \leq Mg/Si \quad (2)$$

$$1.0 \leq Si/Ca \leq 5.0 \quad (3)$$

$Sn \leq Si$

The Si content needs to be equal to or more than the Sn content. When the Si content is less than the Sn content, excessive Fe is diffused from the steel material into the plating layer, and it is difficult to form a target intermetallic compound.

$15 \leq Mg/Si$

Furthermore, the Si content needs to satisfy $15 \leq Mg/Si$. This improves corrosion resistance in water (simulated acid rain and seawater (salt water)). When the Si content with respect to the Mg content is increased and Mg/Si is less than 15, a large amount of $Mg_2Si$ is formed in the plating layer, and corrosion resistance in water (simulated acid rain and seawater (salt water)) cannot be sufficiently exhibited. $20 \leq Mg/Si$ is preferably satisfied. When Mg/Si is 20 or more, corrosion resistance in salt water is further improved.

$1.0 \leq Si/Ca \leq 5.0$

Si and Ca are easily bonded to each other to form a compound. In addition, Y, La, or Ce is also easily bonded to Si similarly. When Si/Ca is less than 1.0, a large amount of a Ca—Al—Zn-based compound is formed, an Al—Ca—Si-based compound is hardly formed near an interface between the plating layer and the steel material, the plating layer is easily peeled off in water, and corrosion resistance in water is significantly impaired. When Si/Ca exceeds 5.0, an effect of inclusion of Ca in the plating layer is reduced, a large amount of $Mg_2Si$ is formed, an Al—Ca—Si-based compound is not formed, and corrosion resistance in water is significantly impaired. Therefore, this index is introduced as a control index. When $1.0 \leq Si/Ca \leq 5.0$ is satisfied, corrosion resistance in salt water is improved. $1.0 \leq Si/Ca \leq 3.0$ is more preferably satisfied. This further improves corrosion resistance in salt water.

In order to identify the average chemical composition of the plating layer, an acid solution is obtained in which the plating layer is peeled off and dissolved with an acid containing an inhibitor that suppresses corrosion of the base metal (steel material). Next, the obtained acid solution is measured by ICP emission spectrometry or an ICP-MS method to obtain the chemical composition. The type of the acid is not particularly limited as long as the acid can dissolve the plating layer. If the area and weight before and after peeling are measured, a plating adhesion amount (g/m$^2$) can also be obtained at the same time.

Next, the intermetallic compound contained in the plating layer will be described. First, the intermetallic compound contained in the Zn—Al—Mg-based alloy layer will be described. Note that the intermetallic compound described below may be contained in the Al—Fe alloy layer.

Zn Phase

A Zn phase is present in the plating layer, and mainly present as a ternary eutectic structure (Zn/Al/MgZn$_2$ ternary eutectic structure). There is also a Zn phase that is not contained in the ternary eutectic structure. The Zn phase and the ternary eutectic structure containing the Zn phase have low corrosion resistance in water, and disappear in a short period of time when immersed in water (simulated acid rain and seawater (salt water)), and therefore it is necessary to reduce the amount of the Zn phase as much as possible. In the present embodiment, the content of the Zn phase is strictly limited, and Zn contained in the plating layer is formed into a solid solution in an Al phase, formed into an Al—Zn phase, or formed into a MgZn$_2$ phase serving as an intermetallic compound. This makes it possible to ensure corrosion resistance of the plating layer in water (simulated acid rain and seawater (salt water)).

Al Phase

An Al phase is present in a massive form as an Al primary phase in the plating layer. The plating layer of the present embodiment contains a certain amount of Zn, but the Al phase present in a massive form contains at most about 35% of Zn. Therefore, the Al primary phase in a massive is strictly an Al—Zn phase. An Al—Zn phase is an aggregate of extremely fine grains, and is a microstructure in which fine grains of several nm to about 3 m are aggregated when confirmed by a crystal size. There is a case where an aggregate of microstructures containing a fine Al phase and a fine Zn phase is confirmed by X-ray diffraction, TEM, or the like, and such a fine microstructure is also referred to as an Al phase in the present invention.

The Al phase that may contain at most about 35% of Zn forms a stable oxide film such as Al$_2$O$_3$ on a surface, and has high underwater corrosion resistance particularly in water (simulated acid rain). It is presumed that an Al concentration of more than 35% is required for this oxide film. On the other hand, in water containing salt, Al$_2$O$_3$ cannot be stably present, and corrosion resistance is extremely deteriorated.

Note that, in a solidification process of the plating layer, a phase having an Al concentration of 30% or less and containing Zn as a remainder is also formed, but has poor corrosion resistance in water, and therefore is treated as a Zn phase in the present embodiment.

MgZn$_2$ Phase

A MgZn$_2$ phase is present in the plating layer and present in a massive form as the MgZn$_2$ phase. In addition, the MgZn$_2$ phase is contained as fine grains in a certain amount in a dendritic microstructure formed when the MgZn$_2$ phase is solidified together with an Al phase on an Al—MgZn$_2$ eutectic line or a ternary eutectic structure (Zn/Al/MgZn$_2$ ternary eutectic structure). The MgZn$_2$ phase has favorable corrosion resistance in water (simulated acid rain and seawater (salt water)) and high corrosion resistance in both simulated rainwater and salt water. On the other hand, corrosion resistance of the MgZn$_2$ phase depends on a grain size, and MgZn$_2$ or the like contained in the ternary eutectic structure tends to corrode due to coupling reaction or the like. MgZn$_2$ contained in the ternary eutectic structure exhibits a diffraction peak of a (102) plane in X-ray diffraction measurement. Therefore, by reducing the amount of the MgZn$_2$ phase exhibiting an orientation of the (102) plane, corrosion resistance in water (simulated acid rain and seawater (salt water)) tends to be improved.

Next, the intermetallic compound contained in the Al—Fe alloy layer will be described.

As described above, since Al having a certain concentration or more is contained in the plating bath, a Zn—Fe alloy layer included in the plating original sheet is replaced with an Al—Fe alloy layer when the plating original sheet is subjected to post-galvanizing. Examples of the intermetallic compound that may be contained in the Al—Fe alloy layer include an AlFe phase, an Al$_{0.5}$Fe$_{1.5}$ (AlFe$_3$) phase, an Al$_5$Fe$_2$ phase, and Al$_{13}$Fe$_4$. In addition, since Zn having a certain concentration is contained in the plating bath, an intermetallic compound in which a part of Al is replaced with Zn is also present although a crystal form of the Al—Fe alloy layer is not changed. In addition, an intermetallic compound containing Si may also be contained.

In general, among the above-described intermetallic compounds, Al$_5$Fe$_2$ is easily generated mainly. Al$_5$Fe$_2$ is formed in the Al—Fe alloy layer. In addition, Al$_5$Fe$_2$ may be formed at an interface between the Al—Fe alloy layer and the steel material.

However, in the present embodiment, diffusion of Fe is suppressed, and Al$_{13}$Fe$_4$ or Al$_{0.5}$Fe$_{1.5}$ having a relatively high Al proportion is formed by applying a dipping two-stage plating method using the plating bath constituted by the plating composition according to the present invention. As a result, corrosion resistance in water (simulated acid rain and seawater (salt water)) with respect to the entire plating layer is extremely improved. When diffusion of Fe is not appropriately controlled, an Al—Fe alloy layer mainly containing an AlFe phase or an Al—Fe alloy layer containing an Al$_5$Fe$_2$ phase is formed, and corrosion resistance in water (simulated acid rain and seawater (salt water)) is deteriorated.

When a thick plating layer of, for example, 50 μm or more is formed by applying a dipping two-stage plating method, the thickness of the Al—Fe alloy layer is about 30 μm, and the thickness of the Zn—Al—Mg alloy layer is about 20 μm. In underwater corrosion, when a potential difference between the Al—Fe alloy layer and the Zn—Al—Mg alloy layer is large, corrosion of either layer tends to proceed extremely. A natural potential of each layer tends to be base when the content of the Fe component is large, and tends to be noble when the content of the Fe component is small. When the amount of Fe in the Al—Fe alloy layer increases and a natural potential thereof is base, progress of corrosion of the Al—Fe alloy layer is accelerated, and the plating layer tends to collapse. On the other hand, when the amount of Fe in the Al—Fe alloy layer decreases and a natural potential thereof is noble, corrosion easily proceeds at an interface between the Zn—Al—Mg alloy layer and the Al—Fe layer, and the Zn—Al—Mg alloy layer tends to collapse. By using Al$_{13}$Fe$_4$ or Al$_{0.5}$Fe$_{1.5}$ as a main phase of the Al—Fe alloy layer, collapse of the plating layer can be prevented, and corrosion resistance can be ensured in a thick plating layer having, for example, a thickness of 50 μm, and corrosion resistance in water (simulated acid rain and seawater (salt water)) can be ensured.

As described above, as a result of improving the plating layer for the purpose of ensuring corrosion resistance in water (simulated acid rain and seawater (salt water)), the present inventors have found that corrosion resistance in water can be ensured by formation of a specific intermetallic compound. In order to determine inclusion of a specific intermetallic compound in the plating layer, an X-ray diffraction method is preferably used. This detection method can obtain average information of the plating layer as compared with SEM observation, TEM observation, or the like, has small selectivity of a measurement site (field of view), and is excellent in quantification. If measurement conditions are defined, when a specific intermetallic compound is present, a diffraction peak intensity is obtained at a fixed ratio at the same angle (2θ). Therefore, the internal structure of the plating layer can be easily estimated.

Conditions for obtaining an X-ray diffraction image are as follows.

An X-ray diffraction method targeting Cu as an X-ray source is most convenient because average information of constituent phases in the plating layer can be obtained. As an example of measurement conditions, a voltage of 50 kV and a current of 300 mA are used as an X-ray condition. An X-ray diffractometer is not particularly limited, and for example, a sample horizontal strong X-ray diffractometer RINT-TTR III manufactured by Rigaku Corporation can be used.

Hereinafter, a substance to be measured in X-ray diffraction measurement will be described. Substances to be measured are $Al_{0.5}Fe_{1.5}$, Zn, Al, $MgZn_2$, and $Ca(Al_2Si_2)O_8$.

$Al_{0.5}Fe_{1.5}$ $Al_{0.5}Fe_{1.5}$ can ensure corrosion resistance in simulated acid rain and seawater (salt water) in the Al—Fe alloy layer. $Al_{0.5}Fe_{1.5}$ is a substance indicated by the database number (ICDD-JCPDS powder diffraction database) 01-077-6757. The notation is a substance denoted by $(AlFe_3)_{0.5}$, and is equivalent to $Al_{0.5}Fe_{1.5}$. A diffraction angle that is convenient for detecting this intermetallic compound is 2θ of 43.95° ((110) plane).

Zn

Zn is a substance indicated by the database number (ICDD-JCPDS powder diffraction database) 00-004-0831. In a plating composition range of the present embodiment, there is one angle that is convenient for detecting Zn. That is, the angle is a diffraction angle 2θ of 36.30° ((002) plane).

Al

In the plating composition range of the present embodiment, there is one angle that is convenient for detecting Al. That is, the angle is a diffraction angle 2θ of 38.47° ((111) plane).

$MgZn_2$

In the plating composition range of the present embodiment, there is one angle that is convenient for detecting this intermetallic compound. That is, the angle is a diffraction angle 2θ of 19.67° ((100) plane).

$Ca(Al_2Si_2)O_8$

The oxide film that may be formed on a surface of the plating layer contains $Ca(Al_2Si_2)O_8$. $Ca(Al_2Si_2)O_8$ is a substance indicated by the database number (ICDD-JCPDS powder diffraction database) 00-051-0064. In the composition range of the plating layer of the present embodiment, a diffraction angle that is convenient for detecting this intermetallic compound is 2θ of 23.41° ((102) plane).

Diffraction peaks at the above-described diffraction angles do not overlap with a diffraction peak of a main crystal structure of the plating layer, and therefore are convenient for quantification and determination of the content. That is, when a diffraction peak at which a diffraction intensity exceeds a certain level is obtained at these diffraction angles, it can be said that an intended substance is reliably contained.

In an X-ray diffraction pattern of a surface of the plating layer, measured under conditions in which an X-ray output is a voltage of 50 kV and a current of 300 mA using a Cu-Kα ray, $I_1$ obtained from an X-ray diffraction peak of $Al_{0.5}Fe_{1.5}$ is defined by formula (A-1). In this case, in order to ensure corrosion resistance of the hot-dip plated steel material in water (simulated acid rain and seawater (salt water)), it is necessary to satisfy formula (A-2).

[Mathematical Formula 5]

$$I_1 = \frac{I\max(43.45 \sim 44.45°)}{I(43.45) + 0.5\{|I(43.45°) - I(44.45°)|\}} \quad \text{(A-1)}$$

$$1.10 \leq I_1 \quad \text{(A-2)}$$

Note that Imax (k to m°) in formula (A-1) represents an absolute maximum value of an X-ray diffraction intensity between a diffraction angle of k° and a diffraction angle of m°, Imax (n°) represents an X-ray diffraction intensity at a diffraction angle of n°, and k, m, and n each represent a diffraction angle indicated in formula (A-1).

That is, Imax (43.45 to 44.45°) is the absolute maximum value of an X-ray diffraction intensity between a diffraction angle of 43.45° and a diffraction angle of 44.45°, and corresponds to a diffraction intensity of a (110) plane of $Al_{0.5}Fe_{1.5}$. I (43.45°) and I (44.45°) are X-ray diffraction intensities at diffraction angles of 43.45° and 44.45° respectively, and correspond to an intensity of background of a diffraction peak of the (110) plane of $Al_{0.5}Fe_{1.5}$.

The numerator (Imax (43.45 to 44.45°)) of formula (A-1) is an intensity corresponding to a diffraction peak of $Al_{0.5}Fe_{1.5}$ at 2θ=43.95° (110 plane), and is a maximum diffraction intensity of a diffraction peak including an intensity of background. Since the diffraction angle of the (110) plane may deviate from 43.95° due to a measurement error of X-ray diffraction, an absolute maximum value between 43.45° and 44.45° is acquired.

The denominator of formula (A-1) is an intensity of background at a diffraction angle of 43.95°, obtained by calculation from diffraction intensities at 43.45° and 44.45°. That is, as illustrated in FIG. 1, a straight line connecting a diffraction line at 43.45° and a diffraction line at 44.45° is drawn. This straight line is a baseline of a diffraction peak. Next, I (43.45°)-I (44.45°) is obtained. In addition, the ratio (0.50/1.00=0.50) of the difference (0.50°) between a diffraction angle of 43.45° and a diffraction angle of 43.950 to the difference (1.00°) between the diffraction angle of 43.45° and the diffraction angle of 44.45° is obtained. Then, an intensity of background at the diffraction angle of 43.95° is calculated by the mathematical formula described in the denominator of the above formula (A-1).

By setting formula (A-1) as described above, the intensity of the diffraction peak of $Al_{0.5}Fe_{1.5}$ at 2θ=43.95° ((110) plane) can be accurately measured even when a measurement error or a fluctuation in the background occurs due to a difference in measurement conditions.

As illustrated in formula (A-2), when $I_1$ is 1.10 or more, a sufficient amount of $Al_{0.5}Fe_{1.5}$ is contained in the Al—Fe alloy layer of the plating layer, and corrosion resistance in water can be ensured. That is, corrosion resistance in simulated rainwater and salt water is improved. $I_1$ is preferably a large numerical value, and more preferably 2.0 or more. When $I_1$ is 2.0 or more, most of the Al—Fe alloy layer is $Al_{0.5}Fe_{1.5}$, and no other Al—Fe compound is observed. When $I_1$ is 1.10 to 2.00, $Al_{13}Fe_4$ may be confirmed in addition to $Al_{0.5}Fe_{1.5}$. When $I_1$ is less than 1.10, an AlFe compound other than $Al_{0.5}Fe_{1.5}$ and $Al_{13}Fe_4$ is present. By setting immersion time to less than 20 seconds in post-galvanizing, formula (A-2) is satisfied. The upper limit of $I_1$ is not particularly limited, but may be 2.50 or less.

In order to ensure corrosion resistance of a hot-dip plated steel material in water (simulated acid rain and seawater (salt water)), formula (B-2) needs to be satisfied when $I_2$ obtained from X-ray diffraction peaks of Zn, Al, and $MgZn_2$ is defined by formula (B-1) in an X-ray diffraction pattern of a surface of the plating layer, measured under conditions in which an X-ray output is a voltage of 50 kV and a current of 300 mA using a Cu-Kα ray.

[Mathematical Formula 6]

$$I_2 = \frac{Imax(36.00 \sim 36.60°)}{Imax(36.00 \sim 36.60°) + Imax(38.00 \sim 39.00°) + Imax(19.20 \sim 20.00°)} \quad (B\text{-}1)$$

$$I_2 \leq 0.25 \quad (B\text{-}2)$$

Note that Imax (k to m°) in formula (B-1) represents an absolute maximum value of an X-ray diffraction intensity between a diffraction angle of k° and a diffraction angle of m°.

That is, Imax (36.00 to 36.60°) in formula (B-1) is an absolute maximum value of an X-ray diffraction intensity between a diffraction angle of 36.00° and a diffraction angle of 36.60°, and corresponds to a diffraction intensity of a (002) plane of Zn.

That is, Imax (38.00 to 39.00°) is an absolute maximum value of an X-ray diffraction intensity between a diffraction angle of 38.00° and a diffraction angle of 39.00°, and corresponds to a diffraction intensity of a (111) plane of Al.

Imax (19.20 to 20.00°) is an absolute maximum value of an X-ray diffraction intensity between a diffraction angle of 19.200 and a diffraction angle of 20.00°, and corresponds to a diffraction intensity of a (100) plane of $MgZn_2$.

Therefore, $I_2$ defined by formula (B-1) represents the proportion of the diffraction intensity of Zn to the total diffraction intensity of Zn, Al, and $MgZn_2$, and the smaller $I_2$ means that the amount of the Zn phase in the plating layer is smaller. In the present embodiment, $I_2$ is 0.25 or less. This makes it possible to ensure corrosion resistance in water (simulated acid rain and seawater (salt water)). That is, in the plating layer, a low proportion of the Zn phase leads to improvement of corrosion resistance in water, corrosion resistance in simulated rainwater and salt water is improved, and the plating layer can be maintained in water. By setting the Al content in the plating layer to more than 30% and the Mg content to more than 5.0%, the amount of the Zn phase can be reduced. In addition, the amount of the Zn phase is affected by behavior of forming the Al—Fe alloy layer. When a large amount of AlFe or $Al_5Fe_2$ is formed, the amount of the Zn phase tends to increase, and therefore, it is necessary to satisfy both formulas (A-2) and (B-2). $I_2$ is preferably less than 0.10. The lower limit of $I_2$ is not particularly limited, but may be 0 or more.

Next, in the composition range of the plating layer of the present embodiment, the $MgZn_2$ phase is crystallized. The $MgZn_2$ phase originally has high corrosion resistance in water (simulated acid rain and seawater (salt water)), but when the $MgZn_2$ phase is surrounded by a fine Al phase or a fine Zn phase, corrosion is promoted by coupling reaction between these phases. In addition, the $MgZn_2$ phase has a corrosion potential lower than the Zn phase. Therefore, the $MgZn_2$ phase surrounded by the Al phase or the Zn phase is eluted early into water (simulated acid rain and seawater (salt water)). Examples of such a $MgZn_2$ phase include a $MgZn_2$ phase contained in the ternary eutectic structure in the plating layer. Therefore, in the present embodiment, it is preferable to reduce the amount of the $MgZn_2$ phase contained in the ternary eutectic structure, and eventually, it is preferable to reduce the amount of the ternary eutectic structure.

There is one diffraction angle that is convenient for detecting the $MgZn_2$ phase contained in the ternary eutectic structure by X-ray diffraction. Most of the $MgZn_2$ phase contained in the ternary eutectic structure has a strong diffraction intensity of the (102) plane. That is, a diffraction peak appearing at a diffraction intensity at a diffraction angle 2θ of 28.73° ((102) plane) does not overlap with a diffraction peak of a main crystal structure of the plating layer, and therefore is convenient for quantification and determination of the content. That is, when a diffraction peak at which the diffraction intensity exceeds a certain level is obtained at these diffraction angles, it can be said that an intended phase is reliably contained.

The $MgZn_2$ phase exhibiting a crystal orientation other than the (102) plane is a coarse $MgZn_2$ phase that covers the Al phase by a peritectic reaction or a coarse $MgZn_2$ phase precipitated by a reaction other than a ternary eutectic reaction, and has high corrosion resistance in water (simulated acid rain and seawater (salt water)). The $MgZn_2$ phase excellent in corrosion resistance in water exhibits diffraction intensities at diffraction angles 2θ of 20.78° ((002) plane) and 22.26° ((101) plane) in addition to the above-described diffraction angle 2θ of 19.67° ((100) plane). The diffraction peaks appearing at these diffraction angles do not overlap with a diffraction peak of a main crystal structure of the plating layer, and therefore are convenient for quantification and determination of the content.

Most of the $MgZn_2$ phase contained in the plating layer often exhibits any of the above four diffraction peaks. Therefore, in the hot-dip plated steel material of the present embodiment, in an X-ray diffraction pattern of a surface of the plating layer, measured under conditions in which an X-ray output is a voltage of 50 kV and a current of 300 mA using a Cu-Kα ray, when $I_3$ obtained from an X-ray diffraction peak of $MgZn_2$ is defined by formula (C-1), formula (C-2) is preferably satisfied.

[Mathematical Formula 7]

$$I_3 = \frac{Imax(28.52 \sim 28.92°)}{\{Imax(19.20 \sim 20.00°) + Imax(20.58 \sim 20.98°) + Imax(22.06 \sim 22.46°) + Imax(28.52 \sim 28.92°)\}} \quad (C\text{-}1)$$

$$I_3 \leq 0.03 \quad (C\text{-}2)$$

Note that Imax (k to m°) in formula (C-1) represents an absolute maximum value of an X-ray diffraction intensity between a diffraction angle of k° and a diffraction angle of m°, and k and m each represent a diffraction angle indicated in formula (C-1).

That is, Imax (28.52 to 28.92°) in formula (C-1) is an absolute maximum value of an X-ray diffraction intensity between a diffraction angle of 28.52° and a diffraction angle of 28.92°, and corresponds to a diffraction intensity of a (102) plane of $MgZn_2$. This $MgZn_2$ corresponds to the $MgZn_2$ phase contained in the ternary eutectic structure.

Imax (19.20 to 20.00°) is an absolute maximum value of an X-ray diffraction intensity between a diffraction angle of 19.20° and a diffraction angle of 20.00°, and corresponds to a diffraction intensity of a (100) plane of $MgZn_2$.

Imax (20.58 to 20.98°) is an absolute maximum value of an X-ray diffraction intensity between a diffraction angle of 20.58° and a diffraction angle of 20.98°, and corresponds to a diffraction intensity of a (002) plane of $MgZn_2$.

Imax (22.06 to 22.45°) is an absolute maximum value of an X-ray diffraction intensity between a diffraction angle of 22.06° and a diffraction angle of 22.45°, and corresponds to a diffraction intensity of a (101) plane of $MgZn_2$.

Therefore, $I_3$ defined by formula (C-1) represents the proportion of the diffraction intensity of the $MgZn_2$ phase contained in the ternary eutectic structure to the total diffraction intensity of $MgZn_2$ contained in the plating layer, and the smaller $I_3$ means that the amount of the $MgZn_2$ phase contained in the ternary eutectic structure, and eventually, the amount of the ternary eutectic structure is smaller. In the present embodiment, $I_3$ is 0.03 or less. As a result, the $MgZn_2$ phase present as the ternary eutectic structure almost disappears, and corrosion resistance in simulated acid rain and salt water is further improved. The lower limit of $I_3$ is not particularly limited, but may be 0 or more. In order to control $I_3$, it is preferable to control immersion time in a plating bath in a dipping two-stage plating method.

Next, an oxide film containing $Ca(Al_2Si_2)O_8$ may be formed on a surface of the plating layer of the hot-dip plated steel material of the present embodiment. $Ca(Al_2Si_2)O_8$ improves corrosion resistance of the plating layer in simulated rainwater and salt water, and therefore an oxide film containing $Ca(Al_2Si_2)O_8$ is preferably formed. Therefore, in the hot-dip plated steel material of the present embodiment, in an X-ray diffraction pattern of a surface of the plating layer, measured under conditions in which an X-ray output is a voltage of 50 kV and a current of 300 mA using a Cu-Kα ray, when $I_4$ obtained from an X-ray diffraction peak of $Ca(Al_2Si_2)O_8$ is defined by formula (D-1), formula (D-2) is preferably satisfied.

[Mathematical Formula 8]

$$I_4 = \frac{I\max(22.91 \sim 23.91°)}{I(22.91°) + 0.5\{|I(22.91°) - I(23.91°)|\}} \quad \text{(D-1)}$$

$$1.1 \leq I_4 \quad \text{(D-2)}$$

Note that Imax (k to m°) in formula (D-1) represents an absolute maximum value of an X-ray diffraction intensity between a diffraction angle of k° and a diffraction angle of m°, Imax (n°) represents an X-ray diffraction intensity at a diffraction angle of n°, and k, m, and n each represent a diffraction angle indicated in formula (D-1).

That is, Imax (22.91 to 23.91°) in formula (D-1) is an absolute maximum value of an X-ray diffraction intensity between a diffraction angle of 22.91° and a diffraction angle of 23.91°, and corresponds to a diffraction intensity of a (102) plane of $Ca(Al_2Si_2)O_8$. I (22.91°) and I (23.91°) are X-ray diffraction intensities at diffraction angles of 22.91° and 23.91°, respectively, and correspond to an intensity of background of a diffraction peak of the (102) plane of $Ca(Al_2Si_2)O_8$.

The numerator (Imax (22.91 to 23.91°)) of formula (D-1) is an intensity corresponding to a diffraction peak of $Ca(Al_2Si_2)O_8$ at 2θ=23.41° (102 plane), and is a maximum diffraction intensity of a diffraction peak including an intensity of background. Since the diffraction angle of the (102) plane may deviate from 23.41° due to a measurement error of X-ray diffraction, an absolute maximum value between 22.91° and 23.91° is acquired.

Figure 2:
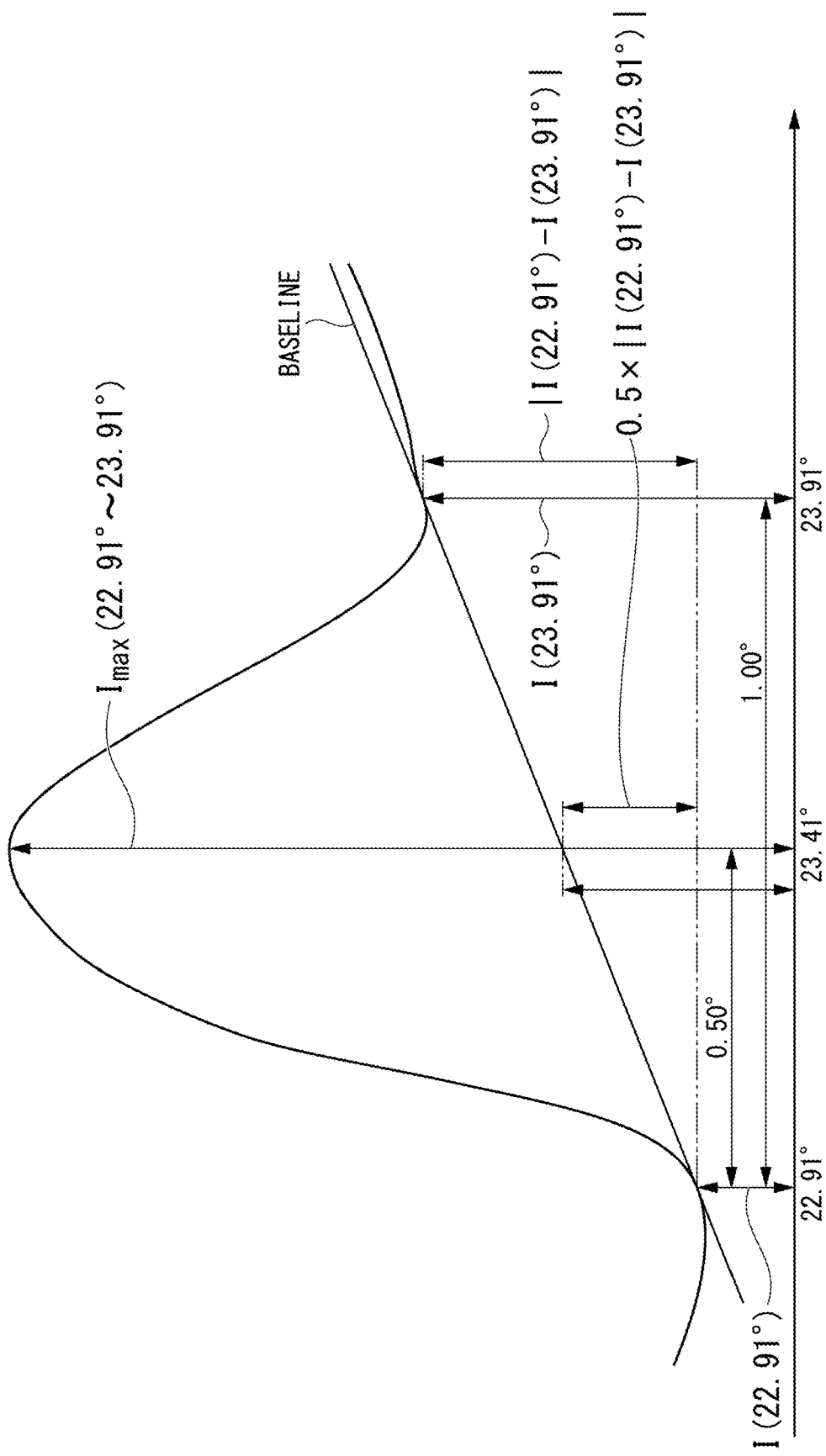
FIG. 2 is a schematic diagram for explaining formula (D-1).

The denominator of formula (D-1) is an intensity of background at a diffraction angle of 23.41°, obtained by calculation from diffraction intensities at 22.91° and 23.91°. That is, as illustrated in FIG. 2, a straight line connecting the diffraction line at 22.91° and the diffraction line at 23.91° is drawn. This straight line is a baseline of a diffraction peak. Next, I (22.91°)-I (23.91°) is obtained. In addition, the ratio (0.50/1.00=0.50) of the difference (0.50°) between a diffraction angle of 22.91° and a diffraction angle of 23.41° to the difference (1.00°) between the diffraction angle of 22.91° and a diffraction angle of 23.91° is obtained. Then, an intensity of background at the diffraction angle of 23.41° is calculated by the mathematical formula described in the denominator of the above formula (D-1).

By setting formula (D-1) as described above, the intensity of the diffraction peak of $Ca(Al_2Si_2)O_8$ at 2θ=23.41° ((102) plane) can be accurately measured even when a measurement error or a fluctuation in the background occurs due to the difference in measurement conditions.

As illustrated in formula (D-2), when $I_4$ is 1.1 or more, corrosion resistance in simulated rainwater and salt water can be ensured. The larger a numerical value of $I_4$, the thicker the oxide film is formed, which is preferable from a viewpoint of ensuring corrosion resistance. The upper limit of $I_4$ is not particularly limited, but may be, for example, 1.5 or less. In order to satisfy formula (D-2), the chemical composition of the plating layer needs to satisfy the scope of the present invention, and an appropriate plating manufacturing method, heat treatment, and atmosphere control need to be performed in a manufacturing method. Specifically, it is necessary to form an oxide film on a surface of the plating bath in advance.

Next, a method for manufacturing the hot-dip plated steel material of the present embodiment will be described.

The hot-dip plated steel material of the present embodiment can be manufactured by a dipping two-stage plating method. In a one-stage post-galvanized method in which a surface of a steel material is subjected to flux treatment and then immersed in a plating bath, residues of flux that has reacted with Mg in the plating bath are likely to remain, and a desired Al—Fe alloy layer cannot be formed. Therefore, the dipping two-stage plating method is appropriate.

The hot-dip plated steel material of the present embodiment is manufactured by using a plated steel material having an interface alloy layer as a plating original sheet, immersing the plating original sheet in a hot-dip plating bath, pulling up the plating original sheet after a lapse of a predetermined immersion time, and then cooling the plating original sheet. In addition, bubbling is performed on the plating bath as necessary. Hereinafter, manufacturing conditions will be described in detail.

As an example, a plated steel material in which a hot-dip galvanized layer is formed in advance on a surface of a steel material (for example, JIS H 8641: 2007) is used as a plating original sheet. The plating layer of the plated steel material needs to contain a Zn—Fe alloy layer (interface alloy layer) having a thickness in a specific range. The plated steel material to be used as the plating original sheet is preferably manufactured by a post-galvanized method. In general, a hot-dip plated steel sheet or the like manufactured by a continuous hot-dip galvanizing line does not include the interface alloy layer or does not have a sufficient thickness of the interface alloy layer even when the hot-dip plated steel sheet includes the interface alloy layer. Therefore, the continuous hot-dip plating method is not suitable for manufacturing the plated steel material to be used as a plating original sheet.

The hot-dip galvanized layer included in the plated steel material used as a plating original sheet preferably has a thickness of more than 30 μm. The hot-dip galvanized layer includes a Zn layer (η phase) and a Zn—Fe alloy layer. The Zn—Fe alloy layer is an interface alloy layer formed between the Zn layer and the steel material, and includes ζ phase, a δ phase, a Γ phase, and a Γ1 phase. These phases are stacked in the order of the Γ phase, the Γ1 phase, the δ phase, and the ζ phase from the steel material side, and the Zn layer which is a η phase is present on the ζ phase. The Zn—Fe alloy layer is replaced with an Al—Fe alloy layer by immersing the plating original sheet in a plating bath for post-galvanizing. Therefore, in order to obtain a desired Al—Fe alloy layer, it is important to make a metallographic structure of the interface alloy layer (Zn—Fe alloy layer) included in the plating original sheet (plated steel material) appropriate. Note that the Zn layer is dissolved when immersed in a plating bath for post-galvanizing, and is replaced with a Zn—Al—Mg alloy layer.

As a result of studying a preferable Zn—Fe alloy layer, the present inventors have found that it is necessary to control the thickness of each phase included in the Zn—Fe alloy layer. By using a plating original sheet including a preferable Zn—Fe alloy layer, $Al_{0.5}Fe_{1.5}$ can be contained in the Al—Fe alloy layer of the hot-dip plated steel material, and $Al_3Fe_4$ can also be contained therein. When an alloy layer outside this range is used, an AlFe phase is formed.

In many cases, the ζ phase contained in the Zn—Fe alloy layer is $FeZn_{13}$ having an Fe concentration of 2 to 6%, the δ phase is $FeZn_7$ having an Fe concentration of 7 to 12%, the Γ phase is $Fe_3Zn_{10}$ with having an Fe concentration of 21 to 27%, and the Γ1 phase is $Fe_5Zn_{21}$. A ratio of the Γ phase or the δ phase increases as immersion time in a plating bath when the plated steel material (plating original sheet) is manufactured by post-galvanizing (first-stage plating) increases, and the ζ phase is formed as the immersion time decreases. Among these phases, a phase that changes to $Al_{0.5}Fe_{1.5}$ or $Al_3Fe_4$ during post-galvanizing on the plating original sheet (during second-stage plating) is the ζ phase. On the other hand, the δ phase changes to $Al_5Fe_2$, the Γ phase and the Γ1 phase change to AlFe or the like. Therefore, the plated steel material (plating original sheet) preferably contains a relatively large amount of the ζ phase among the phases constituting the Zn—Fe alloy layer. When the amounts of the δ phase, the Γ phase, and the Γ1 phase are relatively large, a hot-dip plating layer excellent in corrosion resistance in an underwater environment (simulated acid rain and seawater (salt water)) cannot be formed.

Specifically, a ratio of the average thickness of the ζ phase to the average thickness of the Zn—Fe alloy layer (average thickness of ζ phase/average thickness of Zn—Fe alloy layer) is 0.75 or more. This index means that in the plating original sheet, the δ phase is made as thin as possible, and the Γ phase and the Γ1 phase are hardly formed. Note that it has been found that the Γ phase is formed when the δ phase grows to a predetermined ratio, and the Γ phase is formed when the ratio of average thickness of δ phase/average thickness of Zn—Fe alloy layer exceeds 0.20. An increase in the Γ phase is not preferable because adhesion of the hot-dip plating layer according to the present embodiment is deteriorated. Therefore, the ratio of average thickness of δ phase/average thickness of Zn—Fe alloy layer is preferably 0.20 or less. The average thickness of the Zn—Fe alloy layer is 30 μm or more.

In order to set the ratio of the average thickness of the ζ phase to the average thickness of the Zn—Fe alloy layer (average thickness of ζ phase/average thickness of Zn—Fe alloy layer) to 0.75 or more, immersion time in the post-galvanized method is 60 to 600 seconds, and preferably 120 to 300 seconds. In addition, the temperature of the plating bath is 420 to 520° C., and preferably 430 to 470° C. After the steel sheet is pulled up from the plating bath, the steel sheet is cooled with water from a steel sheet temperature of 300° C. or higher, preferably 350° C. or higher.

The thicknesses of the Zn—Fe alloy layer and the phases can be easily confirmed by etching the plating layer with Nital or the like after polishing, and then observing a cross section with an optical microscope.

Note that some hot-dip galvanized layers in accordance with JIS H 8641 satisfy the above conditions, and some hot-dip galvanized layers in accordance with JIS H 8641 do not satisfy the above conditions. Therefore, it cannot be sweepingly said that any galvanized steel material can be used for the plating original sheet. Preferably, the above conditions are strictly followed, and the Zn layer (η phase) of a surface layer of the hot-dip galvanized layer preferably has a thickness of 30 μm or more. The plating adhesion amount (including the Zn—Fe alloy layer) of the plating original sheet is preferably 300 $g/m^2$ or more for one surface.

Next, conditions for post-galvanizing will be described.

In the manufacturing method of the present embodiment, the plating original sheet is immersed in a hot-dip plating bath and then pulled up. Components of the plating layer can be controlled by components of a plating bath to be prepared. In preparation of the plating bath, an alloy of the plating bath components is prepared by mixing predetermined amounts of pure metals, for example, by a dissolution method under an inert atmosphere.

It is not necessary to heat the plating original sheet before immersion. This is because, when the plating original sheet is heated, Al—Fe reaction is too active during immersion in the plating bath, and a desired Al—Fe alloy layer cannot be obtained.

The temperature of the plating bath is 530° C. or higher and 600° C. or lower when the Al concentration is 35% or less, and 570° C. or higher and 630° C. or lower when the Al concentration is more than 35%.

In order to obtain a desired Al—Fe alloy layer, it is necessary to control immersion time of the plating original sheet in the plating bath. The immersion time in the plating bath is in a range of 2 seconds or more and less than 20 seconds. The immersion time is preferably in a range of 3 to 10 seconds. When the immersion time is 10 seconds or more, more $Al_{13}Fe_4$ is formed than $Al_{0.5}Fe_{1.5}$. When the immersion time is 20 seconds or more, a large amount of $Al_5Fe_2$ and AlFe are formed in the Al—Fe alloy layer, the amount of $Al_{0.5}Fe_{1.5}$ decreases, and the above formula (A-2) cannot be satisfied. In order to control orientation of crystals of $MgZn_2$ to reduce the amount of the Zn phase, the immersion time needs to be 2 seconds or more. Therefore, the immersion time in the plating bath is 2 seconds or more and less than 20 seconds.

After the plating original sheet is pulled up from the plating bath, the plating original sheet is cooled such that time required from when the plating original sheet is pulled up from the plating bath to when the surface temperature of the adhering molten metal (plating layer) reaches 450° C. is 5 seconds or less. This is performed for suppressing diffusion of Fe from the base metal as much as possible. When the temperature of the plating layer reaches lower than 450° C., diffusion of Fe substantially converges, and therefore the time required for reaching 450° C. is controlled.

When an oxide film is formed on a surface of the plating layer, it is preferable to circulate the plating bath by air bubbling or the like. By performing air bubbling, an oxide film is formed on a surface of the plating bath. This oxide film is lifted up when the plating original sheet is pulled up and adheres to the surface of the molten metal (plating bath). When an invasion/pull-up speed of the plating original sheet during immersion in the plating bath and during pull-up from the plating bath is too fast, the oxide film may be broken and the oxide film cannot be formed on the entire surface of the plating layer in some cases. Therefore, the invasion/pull-up speed of the plating original sheet is preferably adjusted to 10 cm/sec or less. Note that, since the invasion/pull-up speed may also depend on the shape of the plating original sheet, the above conditions are merely a guide.

When the oxide film is formed without performing air bubbling, the oxide film may be formed on a surface of the plating bath by holding the plating bath for a long period of time while leaving the plating bath still, and then the plating original sheet may be immersed therein. Note that, since it takes a long time to form the oxide film on the surface of the plating bath without bubbling, formation of the oxide film without bubbling is not suitable when a plurality of plating original sheets is continuously immersed.

When post-galvanizing is performed using, as a plating original sheet, a plated steel material having a Zn—Fe alloy layer as an interface alloy layer, the Zn layer of the surface layer of the plating original sheet is dissolved in the plating bath and replaced with a Zn—Al—Mg-based alloy layer. In addition, iron contained in the Zn—Fe alloy layer of the plating original sheet reacts with Al in the plating bath to generate an Fe—Al-based compound, and a new Al—Fe alloy layer containing the Fe—Al-based compound is formed between the steel material and the Zn—Al—Mg-based alloy layer. The Al—Fe alloy layer contains a large amount of $Al_{0.5}Fe_{1.5}$.

After post-galvanizing, various chemical conversion treatments and coating treatments may be performed. It is also possible to further impart a plating layer of Cr, Ni, Au, or the like by utilizing an uneven pattern on the plating surface, and to further apply coating to impart a design. In addition, in order to further enhance corrosion resistance, repair touch-up paint, a thermal spraying treatment, and the like may be performed in a welded portion, a processed portion, and the like.

In the plated steel material of the present embodiment, a film may be formed on the plating layer. A film composed of a single layer or two or more layers can be formed. Examples of the type of the film immediately above the plating layer include a chromate film, a phosphate film, and a chromate-free film. A chromate treatment, a phosphating treatment, and a chromate-free treatment for forming these films can be performed by known methods.

The chromate treatment includes an electrolytic chromate treatment in which a chromate film is formed by electrolysis, a reaction type chromate treatment in which a film is formed by utilizing a reaction with a material and then an excess treatment liquid is washed away, and an application type chromate treatment in which a film is formed by applying a treatment liquid to an object to be coated and drying the treatment liquid without washing with water. Any treatment may be adopted.

Examples of the electrolytic chromate treatment include electrolytic chromate treatments using chromic acid, a silica sol, a resin (phosphate, acrylic resin, vinyl ester resin, vinyl acetate acrylic emulsion, carboxylated styrene-butadiene latex, diisopropanolamine-modified epoxy resin, and the like), and hard silica.

Examples of the phosphating treatment include zinc phosphate treatment, zinc calcium phosphate treatment, and manganese phosphate treatment.

The chromate-free treatment which does not impose a burden on the environment is particularly suitable. The chromate-free treatment includes an electrolytic chromate-free treatment in which a chromate-free film is formed by electrolysis, a reaction type chromate-free treatment in which a film is formed by utilizing a reaction with a material and then an excess treatment liquid is washed away, and an application type chromate-free treatment in which a film is formed by applying a treatment liquid to an object to be coated and drying the treatment liquid without washing with water. Any treatment may be adopted.

Further, an organic resin film composed of a single layer or two or more layers may be formed on the film immediately above the plating layer. The organic resin is not limited to a specific type, and examples thereof include polyester resins, polyurethane resins, epoxy resins, acrylic resins, polyolefin resins, and modified products of these resins. Here, the modified product refers to a resin obtained by reacting a reactive functional group included in the structure of these resins with another compound (a monomer, a crosslinking agent, or the like) having a functional group capable of reacting with the functional group in the structure.

As such an organic resin, one type or two or more types of organic resins (unmodified organic resins) may be mixed and used, or one type or two or more types of organic resins obtained by modifying, in the presence of at least one type of organic resin, at least one type of another organic resin may be mixed and used. The organic resin film may contain any coloring pigment or an antirust pigment. It is also possible to use a water-based organic resin prepared by dissolving or dispersing these organic resins in water.

Note that, in the present embodiment, corrosion resistance in acid rainwater and corrosion resistance in salt water are measured and evaluated as follows. A case where both an evaluation of the corrosion resistance in acid rainwater and an evaluation of the corrosion resistance in salt water are "E" is judged to be unacceptable, and the other cases are judged to be acceptable.

(Corrosion Resistance in Acid Rainwater)

Corrosion resistance in acid rainwater is evaluated by a simulated acid rain corrosion resistance test. This test is a test assuming a situation in which acid rain in the air flows in. As simulated acid rain, test water obtained by adding NaCl, $HNO_3$, and $H_2SO_4$ to deionized water, and adjusting the pH of the mixture with NaOH such that the concentration of $Cl^-$ is 10 ppm, the concentration of $NO^{3-}$ is 20 ppm, the concentration of $SO_4^{2-}$ is 40 ppm, and the pH is 5.0±0.2 is prepared. 60 L of the test water is put into a cuboid container having a side length of 50 cm. A plated steel sheet test piece is attached to a distal end of a stainless-steel shaft (φ 25 mm) with a jig and a bolt. The test piece is a disk having a diameter of 130 mm. A hole is formed at the center of the disk, and the distal end of the stainless-steel shaft is fitted and fixed in the hole. The test piece is immersed in the test water, and the test piece is rotated at a high speed such that an outer peripheral speed of the test piece is 2.2 m/s. A portion where the test piece touches the jig is insulated by a tape seal or the like. The pH is constantly monitored, and when the pH is out of a range of 5.0±0.2, the pH is returned to 5.0 with dilute hydrochloric acid or a NaOH aqueous solution. The water temperature is kept in a range of 23 to 25° C. The test solution is replaced every 250 hours. After a lapse of 1000 hours, the test piece is taken out and immersed in a 30% chromic acid (VI) aqueous solution for 15 minutes, and a weight difference before and after immersion is measured to determine a corrosion loss (g/m²). An end surface portion of the test piece is opened, and the center hole portion of the test piece is not evaluated. The evaluation criteria are as follows.

Corrosion loss of less than 5 g/m²: Corrosion resistance in simulated acid rain is evaluated as "S"
Corrosion loss of 5 to less than 15 g/m²: Corrosion resistance in simulated acid rain is evaluated as "A"
Corrosion loss of 15 to less than 30 g/m²: Corrosion resistance in simulated acid rain is evaluated as "B"
Corrosion loss of 30 to less than 50 g/m²: Corrosion resistance in simulated acid rain is evaluated as "C"
Corrosion loss of 50 to less than 75 g/m²: Corrosion resistance in simulated acid rain is evaluated as "D"
Corrosion loss of 75 g/m² or more: Corrosion resistance in simulated acid rain is evaluated as "E"

(Corrosion Resistance in Salt Water)

Corrosion resistance in salt water is evaluated by a corrosion resistance test in a salt water aqueous solution. This test is performed in a similar manner to the simulated acid rain corrosion resistance test except that the test water is replaced with a 5% NaCl aqueous solution. After a lapse of 1000 hours, a test piece is immersed in a 30% chromic acid (VI) aqueous solution for 15 minutes, and a corrosion loss before and after immersion is determined. The evaluation criteria are as follows.

Corrosion loss of less than 30 g/m²: Corrosion resistance in salt water is evaluated as "S"
Corrosion loss of 30 to less than 40 g/m²: Corrosion resistance in salt water is evaluated as "A"
Corrosion loss of 40 to less than 60 g/m²: Corrosion resistance in salt water is evaluated as "B"
Corrosion loss of 60 to less than 80 g/m²: Corrosion resistance in salt water is evaluated as "C"
Corrosion loss of 80 to less than 100 g/m²: Corrosion resistance in salt water is evaluated as "D"
Corrosion loss of 100 g/m² or more: Corrosion resistance in salt water is evaluated as "E"

EXAMPLES

Plated steel materials presented in Tables 1A to 4C were manufactured, and performance thereof was evaluated. Various plating baths were prepared by mixing pure metals. The temperature of the plating bath was 550° C. when the Al concentration was 35% or less, and 600° C. when the Al concentration was more than 35%. A plating original sheet was not heated. As the plating original sheet, A1 to C3 presented in the following Table 5 were used. As conditions for post-galvanizing, D1 to E6 in the following Table 6 were used. Whether or not air bubbling is performed is presented in the following Table 7. The thickness of a plating layer of each of the plating original sheets was more than 30 μm, and the thickness of a η phase was 30 μm or more. The thickness of a ZnFe alloy layer in Table 5 indicates an average thickness. As Comparative Example conditions for an original sheet, A3, B3, and C3 were used. As Comparative Example conditions for post-galvanizing, D6 and E1 to E6 were used.

An intensity of an X-ray was measured as follows.

A hot-dip plated steel material after plating was cut into 20 mm square. Measurement was performed using a high-angle X-ray diffractometer manufactured by Rigaku Corporation (model number RINT-TTR III) under conditions in which an X-ray output is a voltage of 50 kV and a current of 300 mA; copper (Cu) target; goniometer TTR (horizontal goniometer); slit width of Kβ filter: 0.05 mm; longitudinal limiting slit width: 2 mm; light receiving slit width: 8 mm; and light receiving slit 2: open, and under measurement conditions of scan speed: 5 deg./min; step width: 0.01 deg; and scan axis: 2θ (5 to 90°), and a cps intensity at each angle was obtained.

Corrosion resistance in simulated acid rainwater and salt water was measured and evaluated as follows. Results are presented in Tables 4A to 4C. A case where both an evaluation of corrosion resistance in acid rainwater and an evaluation of corrosion resistance in salt water are "E" was judged to be unacceptable, and the other cases were judged to be acceptable.

(Corrosion Resistance in Acid Rainwater)

Corrosion resistance in acid rainwater was evaluated by a simulated acid rain corrosion resistance test. This test is a test assuming a situation in which acid rain in the air flows in. As simulated acid rain, test water obtained by adding NaCl, HNO$_3$, and H$_2$SO$_4$ to deionized water, and adjusting the pH of the mixture with NaOH such that the concentration of Cl$^-$ was 10 ppm, the concentration of NO$^{3-}$ was 20 ppm, the concentration of SO$_4{}^{2-}$ was 40 ppm, and the pH was 5.0±0.2 was prepared. 60 L of the test water was put into a cuboid container having a side length of 50 cm. A plated steel sheet test piece was attached to a distal end of a stainless-steel shaft (φ 25 mm) with a jig and a bolt. The test piece was a disk having a diameter of 130 mm. A hole was formed at the center of the disk, and the distal end of the stainless-steel shaft was fitted and fixed in the hole. The test piece was immersed in the test water, and the test piece was rotated at a high speed such that an outer peripheral speed of the test piece is 2.2 m/s. A portion where the test piece touched the jig was insulated by a tape seal or the like. The pH is constantly monitored, and when the pH is out of a range of 5.0±0.2, the pH is returned to 5.0 with dilute hydrochloric acid or a NaOH aqueous solution. The water temperature was kept in a range of 23 to 25° C. The test solution was replaced every 250 hours. After a lapse of 1000 hours, the test piece was taken out and immersed in a 30% chromic acid (VI) aqueous solution for 15 minutes, and a weight difference before and after immersion was measured to determine a corrosion loss (g/m²). An end surface portion of the test piece was opened, and a center hole portion of the test piece was not evaluated. The evaluation criteria were as follows.

Corrosion loss of less than 5 g/m²: Corrosion resistance in simulated acid rain is evaluated as "S"
Corrosion loss of 5 to less than 15 g/m²: Corrosion resistance in simulated acid rain is evaluated as "A"
Corrosion loss of 15 to less than 30 g/m²: Corrosion resistance in simulated acid rain is evaluated as "B"
Corrosion loss of 30 to less than 50 g/m²: Corrosion resistance in simulated acid rain is evaluated as "C"
Corrosion loss of 50 to less than 75 g/m²: Corrosion resistance in simulated acid rain is evaluated as "D"
Corrosion loss of 75 g/m² or more: Corrosion resistance in simulated acid rain is evaluated as "E"

(Corrosion Resistance in Salt Water)

Corrosion resistance in salt water was evaluated by a corrosion resistance test in a salt water aqueous solution. This test was performed in a similar manner to the simulated acid rain corrosion resistance test except that the test water was replaced with a 5% NaCl aqueous solution. After a lapse of 1000 hours, a test piece is was immersed in a 30% chromic acid (VI) aqueous solution for 15 minutes, and a corrosion loss before and after immersion was determined. The evaluation criteria were as follows.

Corrosion loss of less than 30 g/m$^2$: Corrosion resistance in salt water is evaluated as "S"
Corrosion loss of 30 to less than 40 g/m$^2$: Corrosion resistance in salt water is evaluated as "A"
Corrosion loss of 40 to less than 60 g/m$^2$: Corrosion resistance in salt water is evaluated as "B"
Corrosion loss of 60 to less than 80 g/m$^2$: Corrosion resistance in salt water is evaluated as "C"
Corrosion loss of 80 to less than 100 g/m$^2$: Corrosion resistance in salt water is evaluated as "D"
Corrosion loss of 100 g/m$^2$ or more: Corrosion resistance in salt water is evaluated as "E"

As presented in Tables 1A to 4C, in Nos. 1 and 8, the Al content was out of the scope of the present invention, as a result, $I_1$ and $I_2$ were out of the scope of the invention, and therefore corrosion resistance in water was deteriorated.

In Nos. 9 and 14, the Mg content was out of the scope of the present invention, as a result, $I_1$ and $I_2$ were out of the scope of the invention, and therefore corrosion resistance in water was deteriorated.

In Nos. 17, 19, 21, and 24, the elements of the element group A were out of the scope of the present invention, as a result, $I_1$ and $I_2$ were out of the scope of the invention, and therefore corrosion resistance in water was deteriorated.

In Nos. 25, 32, 33, 49, 51, 53, and 54, the elements of the element group B were out of the scope of the present invention, as a result, $I_1$ and $I_2$ were out of the scope of the invention, and therefore corrosion resistance in water was deteriorated.

In Nos. 35 to 47 and 96 to 108, manufacturing conditions were out of the preferable range, as a result, $I_1$ and $I_2$ were out of the invention range, and corrosion resistance in water was deteriorated.

In Nos. 55 and 61, the Si content was out of the scope of the present invention, as a result, $I_1$ and $I_2$ were out of the scope of the present invention, and therefore corrosion resistance in water was deteriorated.

In No. 57, the Mg/Si ratio was out of the scope of the present invention, as a result, $I_1$ and $I_2$ were out of the scope of the present invention, and therefore corrosion resistance in water was deteriorated.

In Nos. 63, 65, 67, 69, 71, 73, 75, 77, 79, and 80, the elements of the element group C were out of the scope of the present invention, as a result, $I_1$ and $I_2$ were out of the scope of the present invention, and therefore corrosion resistance in water was deteriorated.

In No. 78, Fe was out of the scope of the present invention, as a result, $I_1$ and $I_2$ were out of the scope of the present invention, and therefore corrosion resistance in water was deteriorated. In No. 115, Fe was out of the scope of the present invention, as a result, $I_1$ was out of the scope of the present invention, and therefore corrosion resistance in water was deteriorated. In No. 116, Fe was out of the scope of the present invention and formula (1) was out of the scope of the present invention, as a result, $I_1$ was out of the scope of the invention, and therefore corrosion resistance in water was deteriorated.

In Nos. 82, 84, 86, 88, 90, 92, 94, 110, 112, and 114, the elements of the element group D were out of the scope of the present invention, as a result, $I_1$ and $I_2$ were out of the scope of the present invention, and therefore corrosion resistance in water was deteriorated.

On the other hand, as presented in Tables 1A to 4C, in the hot-dip plated steel materials other than those described above, the chemical composition of the plating layers and $I_1$ and $I_2$ satisfied the scope of the invention, and corrosion resistance in water was excellent. The thickness of the plating layer of each of these hot-dip plated steel materials was in a range of 70 to 90 μm as a thickness for one surface, the thickness of the Al—Fe alloy layer was in a range of 50 to 60 μm, and the thickness of the Zn—Al—Mg alloy layer was in a range of 20 to 30 μm.

TABLE 1A

| No. | Category | Plating | manufacturing method | | Chemical composition of plating layer (mass %) Remainder: Zn and impurities | | | |
|---|---|---|---|---|---|---|---|---|
| | | | | | Al | Mg | Additive element group A | |
| | | | | | | | Sn | Bi |
| 1 | Comparative Example | A1 | D1 | F1 | <u>22.5</u> | 5.0 | 0 | 0 |
| 2 | Example | A2 | D2 | F1 | 23.0 | 5.0 | 0.1 | 0 |
| 3 | Example | A1 | D1 | F2 | 28.0 | 5.0 | 0.1 | 0 |
| 4 | Example | A1 | D1 | F2 | 33.0 | 5.0 | 0.1 | 0 |
| 5 | Example | A2 | D2 | F1 | 38.0 | 5.0 | 0.1 | 0 |
| 6 | Example | A2 | D2 | F1 | 43.0 | 5.0 | 0.1 | 0 |
| 7 | Example | B1 | D1 | F1 | 50.0 | 5.0 | 0.1 | 0 |
| 8 | Comparative Example | B1 | D1 | F1 | <u>52.0</u> | 5.0 | 0.1 | 0 |
| 9 | Comparative Example | B1 | D2 | F2 | 35.0 | <u>3.0</u> | 0.1 | 0 |
| 10 | Example | B1 | D2 | F2 | 35.0 | 3.5 | 0.1 | 0 |
| 11 | Example | C1 | D1 | F1 | 35.0 | 6.0 | 0.1 | 0 |
| 12 | Example | C1 | D1 | F1 | 35.0 | 9.0 | 0.1 | 0 |
| 13 | Example | C2 | D2 | F2 | 35.0 | 12.0 | 0.1 | 0 |
| 14 | Comparative Example | C2 | D2 | F2 | 35.0 | <u>15.5</u> | 0.1 | 0 |
| 15 | Example | C1 | D2 | F1 | 36.0 | 12.0 | 0.3 | 0 |
| 16 | Example | C1 | D2 | F1 | 36.0 | 12.0 | 0.3 | 0 |
| 17 | Comparative Example | A1 | D1 | F1 | 36.0 | 12.0 | <u>0.8</u> | 0 |
| 18 | Example | A1 | D1 | F1 | 40.0 | 3.5 | 0 | 0.3 |
| 19 | Comparative Example | A1 | D2 | F2 | 40.0 | 3.5 | 0 | <u>0.4</u> |

TABLE 1A-continued

| No. | | | | | | | | |
|---|---|---|---|---|---|---|---|---|
| 20 | Example | A1 | D2 | F2 | 40.0 | 3.5 | 0 | 0 |
| 21 | Comparative Example | A2 | D1 | F1 | 40.0 | 3.5 | 0 | 0 |
| 22 | Example | A2 | D1 | F1 | 40.0 | 7.0 | 0.4 | 0 |
| 23 | Example | A2 | D2 | F2 | 37.0 | 9.0 | 0.5 | 0.1 |
| 24 | Comparative Example | A2 | D2 | F2 | 37.0 | 9.0 | 0.6 | 0.1 |
| 25 | Comparative Example | B1 | D2 | F1 | 39.0 | 4.0 | 0.2 | 0 |
| 26 | Example | B1 | D2 | F1 | 39.0 | 4.0 | 0.2 | 0 |
| 27 | Example | B2 | D1 | F1 | 39.0 | 4.0 | 0.15 | 0 |
| 28 | Example | B2 | D1 | F1 | 39.0 | 4.0 | 0.2 | 0 |
| 29 | Example | B1 | D1 | F2 | 39.0 | 4.0 | 0.25 | 0 |
| 30 | Example | B1 | D1 | F2 | 39.0 | 11.0 | 0.1 | 0 |
| 31 | Example | C1 | D2 | F1 | 39.0 | 11.0 | 0.1 | 0 |
| 32 | Comparative Example | C1 | D2 | F1 | 39.0 | 11.0 | 0.1 | 0 |
| 33 | Comparative Example | C1 | D2 | F2 | 30.0 | 8.0 | 0.1 | 0 |
| 34 | Example | A2 | D3 | F1 | 33.0 | 8.0 | 0.1 | 0 |
| 35 | Comparative Example | A3 | D3 | F1 | 33.0 | 8.0 | 0.1 | 0 |
| 36 | Comparative Example | B3 | D3 | F1 | 33.0 | 8.0 | 0.1 | 0 |
| 37 | Comparative Example | C3 | D3 | F1 | 33.0 | 8.0 | 0.1 | 0 |
| 38 | Comparative Example | A3 | D5 | F2 | 33.0 | 8.0 | 0.1 | 0 |
| 39 | Comparative Example | B3 | D5 | F2 | 33.0 | 8.0 | 0.1 | 0 |
| 40 | Comparative Example | C3 | D5 | F2 | 33.0 | 8.0 | 0.1 | 0 |

Chemical composition of plating layer (mass %) Remainder: Zn and impurities

| | Additive element group A | | Additive element group B | | | | |
|---|---|---|---|---|---|---|---|
| No. | In | ΣA | Ca | Y | La | Ce | ΣB |
| 1 | 0 | 0 | 0.2 | 0 | 0 | 0 | 0.20 |
| 2 | 0 | 0.1 | 0.1 | 0 | 0 | 0 | 0.10 |
| 3 | 0 | 0.1 | 0.1 | 0 | 0 | 0 | 0.10 |
| 4 | 0 | 0.1 | 0.1 | 0 | 0 | 0 | 0.10 |
| 5 | 0 | 0.1 | 0.1 | 0 | 0 | 0 | 0.10 |
| 6 | 0 | 0.1 | 0.1 | 0.10 | 0 | 0 | 0.20 |
| 7 | 0 | 0.1 | 0.1 | 0.10 | 0 | 0 | 0.20 |
| 8 | 0 | 0.1 | 0.1 | 0.10 | 0 | 0 | 0.20 |
| 9 | 0 | 0.1 | 0.1 | 0.10 | 0 | 0 | 0.20 |
| 10 | 0 | 0.1 | 0.1 | 0.10 | 0 | 0 | 0.20 |
| 11 | 0 | 0.1 | 0.1 | 0 | 0.10 | 0 | 0.20 |
| 12 | 0 | 0.1 | 0.1 | 0 | 0.10 | 0 | 0.20 |
| 13 | 0 | 0.1 | 0.1 | 0 | 0.10 | 0.10 | 0.30 |
| 14 | 0 | 0.1 | 0.1 | 0 | 0.10 | 0.10 | 0.30 |
| 15 | 0 | 0.3 | 0.2 | 0 | 0 | 0 | 0.20 |
| 16 | 0 | 0.3 | 0.2 | 0 | 0 | 0 | 0.20 |
| 17 | 0 | <u>0.8</u> | 0.2 | 0 | 0 | 0 | 0.20 |
| 18 | 0 | <u>0.3</u> | 0.05 | 0 | 0 | 0.10 | 0.15 |
| 19 | 0 | 0.4 | 0.05 | 0 | 0 | 0.10 | 0.15 |
| 20 | 0.3 | 0.3 | 0.05 | 0 | 0 | 0.10 | 0.15 |
| 21 | <u>0.4</u> | 0.4 | 0.1 | 0 | 0 | 0.10 | 0.20 |
| 22 | <u>0</u> | 0.4 | 0.2 | 0 | 0 | 0 | 0.20 |
| 23 | 0.1 | 0.7 | 0.1 | 0 | 0 | 0.10 | 0.20 |
| 24 | 0.1 | <u>0.8</u> | 0.15 | 0 | 0 | 0.10 | 0.25 |
| 25 | 0 | <u>0.2</u> | 0 | 0 | 0 | 0 | 0 |
| 26 | 0 | 0.2 | 0.04 | 0 | 0 | 0 | 0.04 |
| 27 | 0 | 0.15 | 0.03 | 0 | 0 | 0 | 0.03 |
| 28 | 0 | 0.2 | 0.2 | 0 | 0 | 0 | 0.20 |
| 29 | 0 | 0.25 | 0.25 | 0 | 0 | 0 | 0.25 |
| 30 | 0 | 0.1 | 0.5 | 0 | 0 | 0 | 0.50 |
| 31 | 0 | 0.1 | 0.6 | 0 | 0 | 0 | 0.60 |
| 32 | 0 | 0.1 | <u>0.7</u> | 0 | 0 | 0 | <u>0.70</u> |
| 33 | 0 | 0.1 | <u>0</u> | 0 | 0 | 0 | <u>0</u> |
| 34 | 0 | 0.1 | 0.2 | 0 | 0 | 0 | 0.20 |
| 35 | 0 | 0.1 | 0.2 | 0 | 0 | 0 | 0.20 |
| 36 | 0 | 0.1 | 0.2 | 0 | 0 | 0 | 0.20 |
| 37 | 0 | 0.1 | 0.2 | 0 | 0 | 0 | 0.20 |

TABLE 1A-continued

| | | | | | | | |
|---|---|---|---|---|---|---|---|
| 38 | 0 | 0.1 | 0.2 | 0 | 0 | 0 | 0.20 |
| 39 | 0 | 0.1 | 0.2 | 0 | 0 | 0 | 0.20 |
| 40 | 0 | 0.1 | 0.2 | 0 | 0 | 0 | 0.20 |

The underlined value indicates that the value is out of the scope of the present invention.

TABLE 1B

| No. | Category | Plating | manufacturing method | | Chemical composition of plating layer (mass %) Remainder: Zn and impurities | | | |
|---|---|---|---|---|---|---|---|---|
| | | | | | Al | Mg | Additive element group A | |
| | | | | | | | Sn | Bi |
| 41 | Comparative Example | B2 | D6 | F1 | 33.0 | 8.0 | 0.1 | 0 |
| 42 | Comparative Example | B2 | E1 | F1 | 33.0 | 8.0 | 0.1 | 0 |
| 43 | Comparative Example | B2 | E2 | F1 | 33.0 | 8.0 | 0.1 | 0 |
| 44 | Comparative Example | B2 | E3 | F1 | 33.0 | 8.0 | 0.1 | 0 |
| 45 | Comparative Example | B2 | E4 | F1 | 33.0 | 8.0 | 0.1 | 0 |
| 46 | Comparative Example | B2 | E5 | F1 | 33.0 | 8.0 | 0.1 | 0 |
| 47 | Comparative Example | B2 | E6 | F1 | 33.0 | 8.0 | 0.1 | 0 |
| 48 | Example | C1 | D2 | F2 | 31.0 | 6.0 | 0 | 0 |
| 49 | Comparative Example | C2 | D1 | F1 | 31.0 | 6.0 | 0 | 0 |
| 50 | Example | C2 | D1 | F2 | 31.0 | 6.0 | 0 | 0 |
| 51 | Comparative Example | A1 | D1 | F2 | 31.0 | 6.0 | 0 | 0 |
| 52 | Example | A1 | D1 | F2 | 31.0 | 6.0 | 0 | 0 |
| 53 | Comparative Example | A2 | D3 | F1 | 31.0 | 6.0 | 0 | 0 |
| 54 | Comparative Example | A2 | D3 | F1 | 31.0 | 4.5 | 0 | 0.1 |
| 55 | Comparative Example | B1 | D1 | F1 | 32.0 | 4.5 | 0 | 0.1 |
| 56 | Example | B1 | D1 | F1 | 32.0 | 4.5 | 0 | 0.1 |
| 57 | Comparative Example | B1 | D2 | F2 | 32.0 | 4.5 | 0 | 0.1 |
| 58 | Example | B1 | D2 | F2 | 32.0 | 15.0 | 0 | 0.1 |
| 59 | Example | C1 | D4 | F1 | 32.0 | 15.0 | 0 | 0.1 |
| 60 | Example | C1 | D4 | F1 | 32.0 | 15.0 | 0 | 0.1 |
| 61 | Comparative Example | C1 | D1 | F1 | 32.0 | 15.0 | 0 | 0.1 |
| 62 | Example | C1 | D1 | F1 | 25.0 | 8.0 | 0 | 0.05 |
| 63 | Comparative Example | C2 | D2 | F2 | 25.0 | 8.0 | 0 | 0.05 |
| 64 | Example | C2 | D2 | F2 | 25.0 | 8.0 | 0 | 0.05 |
| 65 | Comparative Example | C1 | D2 | F1 | 25.0 | 8.0 | 0 | 0.05 |
| 66 | Example | C1 | D2 | F1 | 26.0 | 7.0 | 0 | 0 |
| 67 | Comparative Example | A1 | D5 | F1 | 26.0 | 7.0 | 0 | 0 |
| 68 | Example | A1 | D5 | F1 | 26.0 | 7.0 | 0.1 | 0 |
| 69 | Comparative Example | A1 | D2 | F2 | 26.0 | 7.0 | 0.1 | 0 |
| 70 | Example | A1 | D2 | F2 | 45.0 | 14.0 | 0.15 | 0.05 |
| 71 | Comparative Example | A2 | D1 | F1 | 45.0 | 14.0 | 0.15 | 0.05 |
| 72 | Example | A2 | D1 | F1 | 45.0 | 14.0 | 0 | 0 |
| 73 | Comparative Example | A2 | D2 | F2 | 45.0 | 14.0 | 0 | 0 |
| 74 | Example | A2 | D2 | F2 | 45.0 | 13.0 | 0 | 0 |
| 75 | Comparative Example | B1 | D4 | F1 | 45.0 | 13.0 | 0 | 0 |
| 76 | Example | B1 | D4 | F1 | 45.0 | 10.0 | 0 | 0 |
| 77 | Comparative Example | C2 | D5 | F1 | 45.0 | 10.0 | 0 | 0 |
| 78 | Comparative Example | C2 | D5 | F1 | 29.0 | 6.0 | 0.1 | 0 |
| 79 | Comparative Example | B1 | D1 | F2 | 29.0 | 6.0 | 0.1 | 0 |

TABLE 1B-continued

| 80 | Comparative Example | B1 | D1 | F2 | 29.0 | 6.0 | 0.1 | 0 |

| | | Chemical composition of plating layer (mass %) Remainder: Zn and impurities | | | | | |
|---|---|---|---|---|---|---|---|
| | | Additive element group A | | Additive element group B | | | |
| No. | In | ΣA | Ca | Y | La | Ce | ΣB |
| 41 | 0 | 0.1 | 0.2 | 0 | 0 | 0 | 0.20 |
| 42 | 0 | 0.1 | 0.2 | 0 | 0 | 0 | 0.20 |
| 43 | 0 | 0.1 | 0.2 | 0 | 0 | 0 | 0.20 |
| 44 | 0 | 0.1 | 0.2 | 0 | 0 | 0 | 0.20 |
| 45 | 0 | 0.1 | 0.2 | 0 | 0 | 0 | 0.20 |
| 46 | 0 | 0.1 | 0.2 | 0 | 0 | 0 | 0.20 |
| 47 | 0 | 0.1 | 0.2 | 0 | 0 | 0 | 0.20 |
| 48 | 0.1 | 0.1 | 0.3 | 0.25 | 0 | 0 | 0.55 |
| 49 | 0.1 | 0.1 | 0.4 | <u>0.35</u> | 0 | 0 | <u>0.75</u> |
| 50 | 0.1 | 0.1 | 0.3 | 0 | 0.25 | 0 | 0.55 |
| 51 | 0.1 | 0.1 | 0.3 | 0 | <u>0.35</u> | 0 | 0.65 |
| 52 | 0.1 | 0.1 | 0.2 | 0 | 0 | 0.25 | 0.45 |
| 53 | 0.1 | 0.1 | 0.2 | 0 | 0 | <u>0.35</u> | 0.55 |
| 54 | 0 | 0.1 | 0.4 | 0.10 | 0.10 | 0.10 | <u>0.70</u> |
| 55 | 0 | 0.1 | 0.1 | 0.10 | 0.10 | 0 | 0.30 |
| 56 | 0 | 0.1 | 0.1 | 0 | 0 | 0 | 0.10 |
| 57 | 0 | 0.1 | 0.1 | 0 | 0 | 0 | 0.10 |
| 58 | 0 | 0.1 | 0.03 | 0 | 0 | 0 | 0.03 |
| 59 | 0 | 0.1 | 0.25 | 0.10 | 0.10 | 0 | 0.45 |
| 60 | 0 | 0.1 | 0.5 | 0 | 0 | 0 | 0.50 |
| 61 | 0 | 0.1 | 0.5 | 0 | 0 | 0 | 0.50 |
| 62 | 0.1 | 0.15 | 0.2 | 0 | 0 | 0 | 0.20 |
| 63 | 0.1 | 0.15 | 0.2 | 0 | 0 | 0 | 0.20 |
| 64 | 0.1 | 0.15 | 0.2 | 0 | 0.10 | 0 | 0.30 |
| 65 | 0.1 | 0.15 | 0.2 | 0 | 0.10 | 0 | 0.30 |
| 66 | 0 | 0 | 0.3 | 0 | 0 | 0 | 0.30 |
| 67 | 0 | 0 | 0.3 | 0 | 0 | 0 | 0.30 |
| 68 | 0.1 | 0.2 | 0.3 | 0 | 0 | 0 | 0.30 |
| 69 | 0.1 | 0.2 | 0.3 | 0 | 0 | 0 | 0.30 |
| 70 | 0 | 0.2 | 0.3 | 0 | 0 | 0.20 | 0.50 |
| 71 | 0 | 0.2 | 0.2 | 0 | 0 | 0.20 | 0.40 |
| 72 | 0 | 0 | 0.2 | 0.10 | 0 | 0.10 | 0.40 |
| 73 | 0 | 0 | 0.2 | 0.10 | 0 | 0.10 | 0.40 |
| 74 | 0 | 0 | 0.2 | 0 | 0 | 0 | 0.20 |
| 75 | 0 | 0 | 0.2 | 0 | 0 | 0 | 0.20 |
| 76 | 0 | 0 | 0.2 | 0 | 0 | 0 | 0.20 |
| 77 | 0 | 0 | 0.2 | 0 | 0 | 0 | 0.20 |
| 78 | 0 | 0.1 | 0.2 | 0 | 0 | 0 | 0.20 |
| 79 | 0 | 0.1 | 0.2 | 0 | 0 | 0 | 0.20 |
| 80 | 0 | 0.1 | 0.2 | 0 | 0 | 0 | 0.20 |

The underlined value indicates that the value is out of the scope of the present invention.

TABLE 1C

| | | | | | Chemical composition of plating layer (mass %) Remainder: Zn and impurities | | | |
|---|---|---|---|---|---|---|---|---|
| | | | | | | | Additive element group A | |
| No. | Category | Plating manufacturing method | | | Al | Mg | Sn | Bi |
| 81 | Example | C1 | D3 | F1 | 29.0 | 6.0 | 0.1 | 0 |
| 82 | Comparative Example | C1 | D3 | F1 | 29.0 | 6.0 | 0.1 | 0 |
| 83 | Example | C2 | D4 | F2 | 29.0 | 6.0 | 0.1 | 0 |
| 84 | Comparative Example | C2 | D4 | F2 | 29.0 | 6.0 | 0.1 | 0 |
| 85 | Example | C1 | D5 | F1 | 29.0 | 6.0 | 0.1 | 0 |
| 86 | Comparative Example | C1 | D5 | F1 | 29.0 | 6.0 | 0.1 | 0 |
| 87 | Example | A1 | D3 | F1 | 43.0 | 12.0 | 0.2 | 0 |
| 88 | Comparative Example | A1 | D3 | F1 | 43.0 | 12.0 | 0.2 | 0 |
| 89 | Example | A1 | D4 | F2 | 43.0 | 12.0 | 0.2 | 0 |
| 90 | Comparative Example | A1 | D4 | F2 | 43.0 | 12.0 | 0.2 | 0 |
| 91 | Example | A2 | D5 | F1 | 41.0 | 11.0 | 0.2 | 0 |

TABLE 1C-continued

| | | | | | | | | |
|---|---|---|---|---|---|---|---|---|
| 92 | Comparative Example | A2 | D5 | F1 | 41.0 | 11.0 | 0.2 | 0 |
| 93 | Example | A2 | D2 | F2 | 41.0 | 11.0 | 0.2 | 0 |
| 94 | Comparative Example | A2 | D2 | F2 | 41.0 | 11.0 | 0.2 | 0 |
| 95 | Example | A2 | D3 | F1 | 40.0 | 9.0 | 0.2 | 0 |
| 96 | Comparative Example | A3 | D3 | F1 | 40.0 | 9.0 | 0.2 | 0 |
| 97 | Comparative Example | B3 | D3 | F1 | 40.0 | 9.0 | 0.2 | 0 |
| 98 | Comparative Example | C3 | D3 | F1 | 40.0 | 9.0 | 0.2 | 0 |
| 99 | Comparative Example | A3 | D5 | F2 | 40.0 | 9.0 | 0.2 | 0 |
| 100 | Comparative Example | B3 | D5 | F2 | 40.0 | 9.0 | 0.2 | 0 |
| 101 | Comparative Example | C3 | D5 | F2 | 40.0 | 9.0 | 0.2 | 0 |
| 102 | Comparative Example | B2 | D6 | F1 | 40.0 | 9.0 | 0.2 | 0 |
| 103 | Comparative Example | B2 | E1 | F1 | 40.0 | 9.0 | 0.2 | 0 |
| 104 | Comparative Example | B2 | E2 | F1 | 40.0 | 9.0 | 0.2 | 0 |
| 105 | Comparative Example | B2 | E3 | F1 | 40.0 | 9.0 | 0.2 | 0 |
| 106 | Comparative Example | B2 | E4 | F1 | 40.0 | 9.0 | 0.2 | 0 |
| 107 | Comparative Example | B2 | E5 | F1 | 40.0 | 9.0 | 0.2 | 0 |
| 108 | Comparative Example | B2 | E6 | F1 | 40.0 | 9.0 | 0.2 | 0 |
| 109 | Example | B1 | D3 | F1 | 37.0 | 9.0 | 0.2 | 0 |
| 110 | Comparative Example | B1 | D3 | F1 | 37.0 | 9.0 | 0.2 | 0 |
| 111 | Example | B2 | D4 | F1 | 37.0 | 9.0 | 0.2 | 0 |
| 112 | Comparative Example | B2 | D4 | F1 | 37.0 | 9.0 | 0.2 | 0 |
| 113 | Example | B1 | D5 | F2 | 37.0 | 9.0 | 0.2 | 0 |
| 114 | Comparative Example | B1 | D5 | F2 | 37.0 | 9.0 | 0.2 | 0 |
| 115 | Comparative Example | A1 | D1 | F2 | 40.0 | 9.0 | 0.2 | 0 |
| 116 | Comparative Example | A1 | D3 | F2 | 40.0 | 9.0 | 0.1 | 0 |

| | Chemical composition of plating layer (mass %) Remainder: Zn and impurities | | | | | |
|---|---|---|---|---|---|---|
| | Additive element group A | | Additive element group B | | | |
| No. | In | ΣA | Ca | Y | La | Ce | ΣB |
| 81 | 0 | 0.1 | 0.2 | 0 | 0 | 0 | 0.20 |
| 82 | 0 | 0.1 | 0.2 | 0 | 0 | 0 | 0.20 |
| 83 | 0 | 0.1 | 0.2 | 0 | 0 | 0 | 0.20 |
| 84 | 0 | 0.1 | 0.2 | 0 | 0 | 0 | 0.20 |
| 85 | 0 | 0.1 | 0.2 | 0 | 0 | 0 | 0.20 |
| 86 | 0 | 0.1 | 0.2 | 0 | 0 | 0 | 0.20 |
| 87 | 0 | 0.2 | 0.2 | 0 | 0 | 0 | 0.20 |
| 88 | 0 | 0.2 | 0.2 | 0 | 0 | 0 | 0.20 |
| 89 | 0 | 0.2 | 0.2 | 0 | 0 | 0 | 0.20 |
| 90 | 0 | 0.2 | 0.2 | 0 | 0 | 0 | 0.20 |
| 91 | 0 | 0.2 | 0.2 | 0 | 0 | 0 | 0.20 |
| 92 | 0 | 0.2 | 0.2 | 0 | 0 | 0 | 0.20 |
| 93 | 0 | 0.2 | 0.2 | 0 | 0 | 0 | 0.20 |
| 94 | 0 | 0.2 | 0.2 | 0 | 0 | 0 | 0.20 |
| 95 | 0 | 0.2 | 0.2 | 0 | 0 | 0 | 0.20 |
| 96 | 0 | 0.2 | 0.2 | 0 | 0 | 0 | 0.20 |
| 97 | 0 | 0.2 | 0.2 | 0 | 0 | 0 | 0.20 |
| 98 | 0 | 0.2 | 0.2 | 0 | 0 | 0 | 0.20 |
| 99 | 0 | 0.2 | 0.2 | 0 | 0 | 0 | 0.20 |
| 100 | 0 | 0.2 | 0.2 | 0 | 0 | 0 | 0.20 |
| 101 | 0 | 0.2 | 0.2 | 0 | 0 | 0 | 0.20 |
| 102 | 0 | 0.2 | 0.2 | 0 | 0 | 0 | 0.20 |
| 103 | 0 | 0.2 | 0.2 | 0 | 0 | 0 | 0.20 |
| 104 | 0 | 0.2 | 0.2 | 0 | 0 | 0 | 0.20 |
| 105 | 0 | 0.2 | 0.2 | 0 | 0 | 0 | 0.20 |
| 106 | 0 | 0.2 | 0.2 | 0 | 0 | 0 | 0.20 |
| 107 | 0 | 0.2 | 0.2 | 0 | 0 | 0 | 0.20 |

TABLE 1C-continued

|     |   |     |      |   |   |   |      |
|-----|---|-----|------|---|---|---|------|
| 108 | 0 | 0.2 | 0.2  | 0 | 0 | 0 | 0.20 |
| 109 | 0 | 0.2 | 0.2  | 0 | 0 | 0 | 0.20 |
| 110 | 0 | 0.2 | 0.2  | 0 | 0 | 0 | 0.20 |
| 111 | 0 | 0.2 | 0.2  | 0 | 0 | 0 | 0.20 |
| 112 | 0 | 0.2 | 0.2  | 0 | 0 | 0 | 0.20 |
| 113 | 0 | 0.2 | 0.2  | 0 | 0 | 0 | 0.20 |
| 114 | 0 | 0.2 | 0.2  | 0 | 0 | 0 | 0.20 |
| 115 | 0 | 0.2 | 0.2  | 0 | 0 | 0 | 0.20 |
| 116 | 0 | 0.1 | 0.03 | 0 | 0 | 0 | 0.03 |

The underlined value indicates that the value is out of the scope of the present invention.

TABLE 2A

Chemical composition of plating layer (mass %) Remainder: Zn and impurities

| No. | Category | Si | Element group C ||||||||  | Fe |
|---|---|---|---|---|---|---|---|---|---|---|---|---|
|   |   |   | Cr | Ti | Ni | Co | V | Nb | Cu | Mn | ΣC |   |
| 1  | Comparative Example | 0.2  | 0    | 0    | 0    | 0 | 0    | 0    | 0    | 0 | 0    | 5  |
| 2  | Example             | 0.2  | 0.10 | 0    | 0    | 0 | 0    | 0    | 0    | 0 | 0.10 | 8  |
| 3  | Example             | 0.1  | 0.10 | 0    | 0    | 0 | 0    | 0    | 0    | 0 | 0.10 | 2  |
| 4  | Example             | 0.3  | 0    | 0.10 | 0    | 0 | 0    | 0    | 0    | 0 | 0.10 | 3  |
| 5  | Example             | 0.3  | 0    | 0.10 | 0    | 0 | 0    | 0    | 0    | 0 | 0.10 | 9  |
| 6  | Example             | 0.3  | 0    | 0    | 0.10 | 0 | 0    | 0    | 0    | 0 | 0.10 | 9  |
| 7  | Example             | 0.3  | 0    | 0    | 0.10 | 0 | 0    | 0    | 0    | 0 | 0.10 | 7  |
| 8  | Comparative Example | 0.1  | 0    | 0    | 0    | 0 | 0    | 0    | 0    | 0 | 0    | 7  |
| 9  | Comparative Example | 0.1  | 0    | 0    | 0    | 0 | 0    | 0    | 0    | 0 | 0    | 9  |
| 10 | Example             | 0.2  | 0    | 0    | 0    | 0 | 0.10 | 0    | 0    | 0 | 0.10 | 9  |
| 11 | Example             | 0.3  | 0    | 0    | 0    | 0 | 0.10 | 0    | 0    | 0 | 0.10 | 10 |
| 12 | Example             | 0.1  | 0    | 0    | 0    | 0 | 0    | 0.10 | 0    | 0 | 0.10 | 10 |
| 13 | Example             | 0.2  | 0    | 0    | 0    | 0 | 0    | 0.10 | 0    | 0 | 0.10 | 12 |
| 14 | Comparative Example | 0.1  | 0    | 0    | 0    | 0 | 0    | 0    | 0    | 0 | 0    | 12 |
| 15 | Example             | 0.8  | 0    | 0    | 0    | 0 | 0    | 0    | 0.10 | 0 | 0.10 | 12 |
| 16 | Example             | 0.8  | 0    | 0    | 0    | 0 | 0    | 0    | 0.10 | 0 | 0.10 | 12 |
| 17 | Comparative Example | 0.8  | 0    | 0    | 0    | 0 | 0    | 0    | 0    | 0 | 0    | 4  |
| 18 | Example             | 0.1  | 0    | 0    | 0    | 0 | 0    | 0    | 0    | 0 | 0    | 4  |
| 19 | Comparative Example | 0.1  | 0    | 0    | 0    | 0 | 0    | 0    | 0    | 0 | 0    | 6  |
| 20 | Example             | 0.2  | 0    | 0    | 0    | 0 | 0    | 0    | 0    | 0 | 0    | 6  |
| 21 | Comparative Example | 0.2  | 0    | 0    | 0    | 0 | 0    | 0    | 0    | 0 | 0    | 5  |
| 22 | Example             | 0.4  | 0    | 0    | 0    | 0 | 0    | 0    | 0    | 0 | 0    | 5  |
| 23 | Example             | 0.5  | 0    | 0    | 0    | 0 | 0    | 0    | 0.10 | 0 | 0.10 | 8  |
| 24 | Comparative Example | 0.6  | 0    | 0    | 0    | 0 | 0    | 0    | 0.10 | 0 | 0.10 | 8  |
| 25 | Comparative Example | 0.2  | 0    | 0    | 0    | 0 | 0    | 0    | 0    | 0 | 0    | 10 |
| 26 | Example             | 0.2  | 0.10 | 0    | 0.10 | 0 | 0    | 0    | 0    | 0 | 0.20 | 10 |
| 27 | Example             | 0.15 | 0.10 | 0    | 0.10 | 0 | 0    | 0    | 0    | 0 | 0.20 | 9  |
| 28 | Example             | 0.2  | 0    | 0    | 0    | 0 | 0    | 0    | 0    | 0 | 0    | 9  |
| 29 | Example             | 0.25 | 0    | 0    | 0    | 0 | 0    | 0    | 0    | 0 | 0    | 9  |
| 30 | Example             | 0.5  | 0    | 0    | 0    | 0 | 0    | 0    | 0    | 0 | 0    | 9  |
| 31 | Example             | 0.6  | 0    | 0    | 0    | 0 | 0    | 0    | 0    | 0 | 0    | 12 |
| 32 | Comparative Example | 0.7  | 0    | 0    | 0    | 0 | 0    | 0    | 0    | 0 | 0    | 12 |
| 33 | Comparative Example | 0.2  | 0    | 0    | 0    | 0 | 0    | 0    | 0    | 0 | 0    | 12 |
| 34 | Example             | 0.3  | 0    | 0    | 0    | 0 | 0    | 0    | 0    | 0 | 0    | 10 |
| 35 | Comparative Example | 0.3  | 0    | 0    | 0    | 0 | 0    | 0    | 0    | 0 | 0    | 12 |
| 36 | Comparative Example | 0.3  | 0    | 0    | 0    | 0 | 0    | 0    | 0    | 0 | 0    | 14 |
| 37 | Comparative Example | 0.3  | 0    | 0    | 0    | 0 | 0    | 0    | 0    | 0 | 0    | 14 |
| 38 | Comparative Example | 0.3  | 0    | 0    | 0    | 0 | 0    | 0    | 0    | 0 | 0    | 15 |
| 39 | Comparative Example | 0.3  | 0    | 0    | 0    | 0 | 0    | 0    | 0    | 0 | 0    | 19 |

TABLE 2A-continued

| | | Chemical composition of plating layer (mass %) Remainder: Zn and impurities | | | | | | | | | |
|---|---|---|---|---|---|---|---|---|---|---|---|
| | | Element group C | | | | | | | | | |
| No. | Category | Si | Cr | Ti | Ni | Co | V | Nb | Cu | Mn | ΣC | Fe |
| 40 | Comparative Example | 0.3 | 0 | 0 | 0 | 0 | 0 | 0 | 0 | 0 | 0 | 23 |

The underlined value indicates that the value is out of the scope of the present invention.

TABLE 2B

| | | Chemical composition of plating layer (mass %) Remainder: Zn and impurities | | | | | | | | | |
|---|---|---|---|---|---|---|---|---|---|---|---|
| | | Element group C | | | | | | | | | |
| No. | Category | Si | Cr | Ti | Ni | Co | V | Nb | Cu | Mn | ΣC | Fe |
| 41 | Comparative Example | 0.3 | 0 | 0 | 0 | 0 | 0 | 0 | 0 | 0 | 0 | 25 |
| 42 | Comparative Example | 0.3 | 0 | 0 | 0 | 0 | 0 | 0 | 0 | 0 | 0 | 8 |
| 43 | Comparative Example | 0.3 | 0 | 0 | 0 | 0 | 0 | 0 | 0 | 0 | 0 | 9 |
| 44 | Comparative Example | 0.3 | 0 | 0 | 0 | 0 | 0 | 0 | 0 | 0 | 0 | 13 |
| 45 | Comparative Example | 0.3 | 0 | 0 | 0 | 0 | 0 | 0 | 0 | 0 | 0 | 15 |
| 46 | Comparative Example | 0.3 | 0 | 0 | 0 | 0 | 0 | 0 | 0 | 0 | 0 | 18 |
| 47 | Comparative Example | 0.3 | 0 | 0 | 0 | 0 | 0 | 0 | 0 | 0 | 0 | 21 |
| 48 | Example | 0.4 | 0 | 0.10 | 0 | 0 | 0.10 | 0 | 0 | 0 | 0.20 | 12 |
| 49 | Comparative Example | 0.4 | 0 | 0.10 | 0 | 0 | 0.10 | 0 | 0 | 0 | 0.20 | 10 |
| 50 | Example | 0.4 | 0 | 0 | 0 | 0 | 0 | 0 | 0 | 0 | 0 | 10 |
| 51 | Comparative Example | 0.4 | 0 | 0 | 0 | 0 | 0 | 0 | 0 | 0 | 0 | 4 |
| 52 | Example | 0.4 | 0 | 0 | 0 | 0 | 0 | 0 | 0 | 0 | 0 | 4 |
| 53 | Comparative Example | 0.4 | 0 | 0 | 0 | 0 | 0 | 0 | 0 | 0 | 0 | 6 |
| 54 | Comparative Example | 0.4 | 0 | 0 | 0 | 0 | 0 | 0 | 0 | 0 | 0 | 6 |
| 55 | Comparative Example | 0 | 0 | 0 | 0 | 0 | 0 | 0 | 0 | 0 | 0 | 5 |
| 56 | Example | 0.3 | 0 | 0 | 0 | 0 | 0 | 0 | 0 | 0 | 0 | 5 |
| 57 | Comparative Example | 0.4 | 0 | 0 | 0 | 0 | 0 | 0 | 0 | 0 | 0 | 7 |
| 58 | Example | 0.03 | 0 | 0 | 0.10 | 0 | 0 | 0 | 0.10 | 0 | 0.20 | 7 |
| 59 | Example | 0.9 | 0 | 0 | 0.10 | 0 | 0 | 0 | 0.10 | 0 | 0.20 | 15 |
| 60 | Example | 1.0 | 0 | 0 | 0 | 0.10 | 0 | 0 | 0 | 0 | 0.10 | 15 |
| 61 | Comparative Example | 1.1 | 0 | 0 | 0 | 0 | 0 | 0 | 0 | 0 | 0 | 5 |
| 62 | Example | 0.4 | 0.25 | 0 | 0 | 0 | 0 | 0 | 0 | 0 | 0.25 | 5 |
| 63 | Comparative Example | 0.4 | 0.30 | 0 | 0 | 0 | 0 | 0 | 0 | 0 | 0.30 | 11 |
| 64 | Example | 0.3 | 0 | 0.25 | 0 | 0 | 0 | 0 | 0 | 0 | 0.25 | 11 |
| 65 | Comparative Example | 0.3 | 0 | 0.30 | 0 | 0 | 0 | 0 | 0 | 0 | 0.30 | 7 |
| 66 | Example | 0.3 | 0 | 0 | 0.25 | 0 | 0 | 0 | 0 | 0 | 0.25 | 7 |
| 67 | Comparative Example | 0.3 | 0 | 0 | 0.30 | 0 | 0 | 0 | 0 | 0 | 0.30 | 13 |
| 68 | Example | 0.3 | 0 | 0 | 0 | 0.25 | 0 | 0 | 0 | 0 | 0.25 | 13 |
| 69 | Comparative Example | 0.3 | 0 | 0 | 0 | 0.30 | 0 | 0 | 0 | 0 | 0.30 | 4 |
| 70 | Example | 0.9 | 0 | 0 | 0 | 0 | 0.25 | 0 | 0 | 0 | 0.25 | 4 |
| 71 | Comparative Example | 0.9 | 0 | 0 | 0 | 0 | 0.30 | 0 | 0 | 0 | 0.30 | 5 |
| 72 | Example | 0.8 | 0 | 0 | 0 | 0 | 0 | 0.25 | 0 | 0 | 0.25 | 5 |
| 73 | Comparative Example | 0.8 | 0 | 0 | 0 | 0 | 0 | 0.30 | 0 | 0 | 0.30 | 5 |
| 74 | Example | 0.7 | 0 | 0 | 0 | 0 | 0 | 0 | 0.25 | 0 | 0.25 | 5 |
| 75 | Comparative Example | 0.7 | 0 | 0 | 0 | 0 | 0 | 0 | 0.30 | 0 | 0.30 | 13 |
| 76 | Example | 0.6 | 0 | 0 | 0 | 0 | 0 | 0 | 0 | 0.25 | 0.25 | 13 |
| 77 | Comparative Example | 0.6 | 0 | 0 | 0 | 0 | 0 | 0 | 0 | 0.30 | 0.30 | 25 |

TABLE 2B-continued

Chemical composition of plating layer (mass %) Remainder: Zn and impurities

| | | | Element group C | | | | | | | | |
|---|---|---|---|---|---|---|---|---|---|---|---|
| No. | Category | Si | Cr | Ti | Ni | Co | V | Nb | Cu | Mn | ΣC | Fe |
| 78 | Comparative Example | 0.4 | 0 | 0 | 0 | 0 | 0 | 0 | 0 | 0 | 0 | 26 |
| 79 | Comparative Example | 0.4 | 0.20 | 0 | 0.10 | 0 | 0 | 0 | 0 | 0 | <u>0.30</u> | 18 |
| 80 | Comparative Example | 0.2 | 0.05 | 0 | 0.05 | 0 | 0 | 0 | 0.20 | 0 | <u>0.30</u> | 12 |

The underlined value indicates that the value is out of the scope of the present invention.

TABLE 2C

Chemical composition of plating layer (mass %) Remainder: Zn and impurities

| | | | Element group C | | | | | | | | |
|---|---|---|---|---|---|---|---|---|---|---|---|
| No. | Category | Si | Cr | Ti | Ni | Co | V | Nb | Cu | Mn | ΣC | Fe |
| 81 | Example | 0.2 | 0 | 0 | 0 | 0 | 0.10 | 0 | 0 | 0 | 0.10 | 15 |
| 82 | Comparative Example | 0.2 | 0 | 0 | 0 | 0 | 0.10 | 0 | 0 | 0 | 0.10 | 15 |
| 83 | Example | 0.2 | 0 | 0 | 0 | 0 | 0 | 0 | 0.05 | 0.05 | 0.10 | 17 |
| 84 | Comparative Example | 0.1 | 0 | 0 | 0 | 0 | 0 | 0 | 0.05 | 0.05 | 0.10 | 17 |
| 85 | Example | 0.2 | 0 | 0 | 0 | 0 | 0 | 0 | 0 | 0 | 0 | 16 |
| 86 | Comparative Example | 0.1 | 0 | 0 | 0 | 0 | 0 | 0 | 0 | 0 | 0 | 16 |
| 87 | Example | 0.8 | 0 | 0 | 0 | 0 | 0 | 0 | 0 | 0 | 0 | 9 |
| 88 | Comparative Example | 0.8 | 0 | 0 | 0 | 0 | 0 | 0 | 0 | 0 | 0 | 9 |
| 89 | Example | 0.8 | 0 | 0.05 | 0 | 0 | 0 | 0 | 0 | 0 | 0.05 | 10 |
| 90 | Comparative Example | 0.8 | 0 | 0.05 | 0 | 0 | 0 | 0 | 0 | 0 | 0.05 | 10 |
| 91 | Example | 0.5 | 0 | 0 | 0 | 0 | 0.10 | 0 | 0 | 0 | 0.10 | 14 |
| 92 | Comparative Example | 0.5 | 0 | 0 | 0 | 0 | 0.10 | 0 | 0 | 0 | 0.10 | 14 |
| 93 | Example | 0.5 | 0 | 0 | 0.20 | 0 | 0 | 0 | 0 | 0 | 0.20 | 8 |
| 94 | Comparative Example | 0.5 | 0 | 0 | 0.20 | 0 | 0 | 0 | 0 | 0 | 0.20 | 8 |
| 95 | Example | 0.4 | 0 | 0 | 0.20 | 0 | 0 | 0 | 0 | 0 | 0.20 | 10 |
| 96 | Comparative Example | 0.4 | 0 | 0 | 0.20 | 0 | 0 | 0 | 0 | 0 | 0.20 | 12 |
| 97 | Comparative Example | 0.4 | 0 | 0 | 0.20 | 0 | 0 | 0 | 0 | 0 | 0.20 | 14 |
| 98 | Comparative Example | 0.4 | 0 | 0 | 0.20 | 0 | 0 | 0 | 0 | 0 | 0.20 | 14 |
| 99 | Comparative Example | 0.4 | 0 | 0 | 0.20 | 0 | 0 | 0 | 0 | 0 | 0.20 | 15 |
| 100 | Comparative Example | 0.4 | 0 | 0 | 0.20 | 0 | 0 | 0 | 0 | 0 | 0.20 | 19 |
| 101 | Comparative Example | 0.4 | 0 | 0 | 0.20 | 0 | 0 | 0 | 0 | 0 | 0.20 | 23 |
| 102 | Comparative Example | 0.4 | 0 | 0 | 0.20 | 0 | 0 | 0 | 0 | 0 | 0.20 | 25 |
| 103 | Comparative Example | 0.4 | 0 | 0 | 0.20 | 0 | 0 | 0 | 0 | 0 | 0.20 | 8 |
| 104 | Comparative Example | 0.4 | 0 | 0 | 0.20 | 0 | 0 | 0 | 0 | 0 | 0.20 | 9 |
| 105 | Comparative Example | 0.4 | 0 | 0 | 0.20 | 0 | 0 | 0 | 0 | 0 | 0.20 | 13 |
| 106 | Comparative Example | 0.4 | 0 | 0 | 0.20 | 0 | 0 | 0 | 0 | 0 | 0.20 | 15 |
| 107 | Comparative Example | 0.4 | 0 | 0 | 0.20 | 0 | 0 | 0 | 0 | 0 | 0.20 | 18 |
| 108 | Comparative Example | 0.4 | 0 | 0 | 0.20 | 0 | 0 | 0 | 0 | 0 | 0.20 | 21 |
| 109 | Example | 0.3 | 0 | 0 | 0 | 0 | 0 | 0 | 0 | 0 | 0 | 11 |
| 110 | Comparative Example | 0.3 | 0.20 | 0 | 0 | 0 | 0 | 0 | 0 | 0 | 0.20 | 11 |
| 111 | Example | 0.3 | 0.20 | 0 | 0 | 0 | 0 | 0 | 0 | 0 | 0.20 | 15 |
| 112 | Comparative Example | 0.3 | 0.20 | 0 | 0 | 0 | 0 | 0 | 0 | 0 | 0.20 | 15 |
| 113 | Example | 0.3 | 0.20 | 0 | 0 | 0 | 0 | 0 | 0 | 0 | 0.20 | 13 |

TABLE 2C-continued

| | | Chemical composition of plating layer (mass %) Remainder: Zn and impurities | | | | | | | | | | |
|---|---|---|---|---|---|---|---|---|---|---|---|---|
| | | | | | | Element group C | | | | | | |
| No. | Category | Si | Cr | Ti | Ni | Co | V | Nb | Cu | Mn | ΣC | Fe |
| 114 | Comparative Example | 0.3 | 0.20 | 0 | 0 | 0 | 0 | 0 | 0 | 0 | 0.20 | 13 |
| 115 | Comparative Example | 0.3 | 0 | 0 | 0 | 0 | 0 | 0 | 0 | 0 | 0 | <u>1.8</u> |
| 116 | Comparative Example | 0.03 | 0 | 0 | 0 | 0 | 0 | 0 | 0 | 0 | 0 | <u>30</u> |

The underlined value indicates that the value is out of the scope of the present invention.

TABLE 3A

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si-Sn | Mg/Si | Si/Ca |
| 1 | Comparative Example | 0 | 0 | 0 | 0 | 0 | 0 | 0 | 0 | 0 | 0 | 0 | 0.2 | 25.0 | 1.0 |
| 2 | Example | 0.05 | 0 | 0 | 0.05 | 0 | 0 | 0 | 0 | 0 | 0 | 0.10 | 0.1 | 25.0 | 2.0 |
| 3 | Example | 0.05 | 0 | 0.05 | 0.05 | 0 | 0 | 0 | 0 | 0 | 0 | 0.15 | 0 | 50.0 | 1.0 |
| 4 | Example | 0.05 | 0 | 0 | 0.05 | 0 | 0 | 0 | 0 | 0 | 0 | 0.10 | 0.2 | 16.7 | 3.0 |
| 5 | Example | 0.05 | 0 | 0 | 0.05 | 0 | 0 | 0 | 0 | 0 | 0 | 0.10 | 0.2 | 16.7 | 3.0 |
| 6 | Example | 0.05 | 0 | 0 | 0.05 | 0 | 0 | 0 | 0 | 0 | 0 | 0.10 | 0.2 | 16.7 | 3.0 |
| 7 | Example | 0.05 | 0.05 | 0 | 0.05 | 0 | 0 | 0 | 0 | 0 | 0 | 0.15 | 0.2 | 16.7 | 3.0 |
| 8 | Comparative Example | 0.05 | 0.05 | 0 | 0.05 | 0 | 0 | 0 | 0 | 0 | 0 | 0.15 | 0 | 50.0 | 1.0 |
| 9 | Comparative Example | 0.05 | 0.05 | 0 | 0.05 | 0 | 0 | 0 | 0 | 0 | 0 | 0.15 | 0 | 30.0 | 1.0 |
| 10 | Example | 0 | 0 | 0 | 0.05 | 0 | 0 | 0 | 0 | 0 | 0 | 0.05 | 0.1 | 17.5 | 2.0 |
| 11 | Example | 0 | 0 | 0 | 0.05 | 0 | 0 | 0 | 0 | 0 | 0 | 0.05 | 0.2 | 20.0 | 3.0 |
| 12 | Example | 0 | 0 | 0 | 0.05 | 0 | 0 | 0 | 0 | 0 | 0 | 0.05 | 0 | 90.0 | 1.0 |
| 13 | Example | 0 | 0 | 0 | 0.05 | 0 | 0 | 0 | 0 | 0 | 0 | 0.05 | 0.1 | 60.0 | 2.0 |
| 14 | Comparative Example | 0 | 0 | 0 | 0.05 | 0 | 0 | 0 | 0 | 0 | 0 | 0.05 | 0 | 155.0 | 1.0 |
| 15 | Example | 0 | 0 | 0 | 0.05 | 0 | 0 | 0 | 0 | 0 | 0 | 0.05 | 0.5 | 15.0 | 4.0 |
| 16 | Example | 0 | 0 | 0 | 0.05 | 0 | 0 | 0 | 0 | 0 | 0 | 0.05 | 0.5 | 15.0 | 4.0 |
| 17 | Comparative Example | 0 | 0 | 0 | 0.05 | 0 | 0 | 0 | 0 | 0 | 0 | 0.05 | 0 | 15.0 | 4.0 |
| 18 | Example | 0.05 | 0 | 0 | 0 | 0 | 0 | 0 | 0 | 0 | 0 | 0.05 | 0.1 | 35.0 | 2.0 |
| 19 | Comparative Example | 0.05 | 0 | 0 | 0 | 0 | 0 | 0 | 0 | 0 | 0 | 0.05 | 0.1 | 35.0 | 2.0 |
| 20 | Example | 0.05 | 0 | 0 | 0 | 0 | 0 | 0 | 0 | 0 | 0 | 0.05 | 0.2 | 17.5 | 4.0 |
| 21 | Comparative Example | 0.05 | 0 | 0 | 0 | 0 | 0 | 0 | 0 | 0 | 0 | 0.05 | 0.2 | 17.5 | 2.0 |
| 22 | Example | 0.05 | 0 | 0 | 0 | 0 | 0 | 0 | 0 | 0 | 0 | 0.05 | 0 | 17.5 | 2.0 |
| 23 | Example | 0.05 | 0 | 0 | 0 | 0 | 0 | 0 | 0 | 0 | 0 | 0.05 | 0 | 18.0 | 5.0 |
| 24 | Comparative Example | 0.05 | 0 | 0 | 0 | 0 | 0 | 0 | 0 | 0 | 0 | 0.05 | 0 | 15.0 | 4.0 |
| 25 | Comparative Example | 0.05 | 0 | 0 | 0 | 0 | 0 | 0 | 0 | 0 | 0 | 0.05 | 0 | 20.0 | — |
| 26 | Example | 0 | 0 | 0 | 0.05 | 0 | 0 | 0 | 0 | 0 | 0 | 0.05 | 0 | 20.0 | 5.0 |
| 27 | Example | 0 | 0 | 0 | 0.05 | 0 | 0 | 0 | 0 | 0 | 0 | 0.05 | 0 | 26.7 | 5.0 |
| 28 | Example | 0 | 0 | 0 | 0.05 | 0 | 0 | 0 | 0 | 0 | 0 | 0.05 | 0 | 20.0 | 1.0 |
| 29 | Example | 0 | 0 | 0 | 0.05 | 0 | 0 | 0 | 0 | 0 | 0 | 0.05 | 0 | 16.0 | 1.0 |
| 30 | Example | 0 | 0 | 0 | 0.05 | 0 | 0 | 0 | 0 | 0 | 0 | 0.05 | 0.4 | 22.0 | 1.0 |
| 31 | Example | 0 | 0 | 0 | 0.05 | 0 | 0 | 0 | 0 | 0 | 0 | 0.05 | 0.5 | 18.3 | 1.0 |
| 32 | Comparative Example | 0 | 0 | 0 | 0.05 | 0 | 0 | 0 | 0 | 0 | 0 | 0.05 | 0.6 | 15.7 | 1.0 |
| 33 | Comparative Example | 0 | 0 | 0 | 0.05 | 0 | 0 | 0 | 0 | 0 | 0 | 0.05 | 0.1 | 40.0 | — |
| 34 | Example | 0 | 0 | 0 | 0.05 | 0 | 0 | 0 | 0 | 0 | 0 | 0.05 | 0.2 | 26.7 | 1.5 |
| 35 | Comparative Example | 0 | 0 | 0 | 0.05 | 0 | 0 | 0 | 0 | 0 | 0 | 0.05 | 0.2 | 26.7 | 1.5 |
| 36 | Comparative Example | 0 | 0 | 0 | 0 | 0 | 0 | 0 | 0 | 0 | 0 | 0 | 0.2 | 26.7 | 1.5 |
| 37 | Comparative Example | 0 | 0 | 0 | 0 | 0 | 0 | 0 | 0 | 0 | 0 | 0 | 0.2 | 26.7 | 1.5 |
| 38 | Comparative Example | 0 | 0 | 0 | 0 | 0 | 0 | 0 | 0 | 0 | 0 | 0 | 0.2 | 26.7 | 1.5 |
| 39 | Comparative Example | 0 | 0 | 0 | 0 | 0 | 0 | 0 | 0 | 0 | 0 | 0 | 0.2 | 26.7 | 1.5 |

TABLE 3A-continued

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si-Sn | Mg/Si | Si/Ca |
| 40 | Comparative Example | 0 | 0 | 0 | 0 | 0 | 0 | 0 | 0 | 0 | 0 | 0 | 0.2 | 26.7 | 1.5 |

The underlined value indicates that the value is out of the scope of the present invention.

TABLE 3B

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si—Sn | Mg/Si | Si/Ca |
| 41 | Comparative Example | 0 | 0 | 0 | 0 | 0 | 0 | 0 | 0 | 0 | 0 | 0 | 0.2 | 26.7 | 1.5 |
| 42 | Comparative Example | 0 | 0 | 0 | 0 | 0 | 0 | 0 | 0 | 0 | 0 | 0 | 0.2 | 26.7 | 1.5 |
| 43 | Comparative Example | 0 | 0 | 0 | 0 | 0 | 0 | 0 | 0 | 0 | 0 | 0 | 0.2 | 26.7 | 1.5 |
| 44 | Comparative Example | 0 | 0 | 0 | 0 | 0 | 0 | 0 | 0 | 0 | 0 | 0 | 0.2 | 26.7 | 1.5 |
| 45 | Comparative Example | 0 | 0 | 0 | 0 | 0 | 0 | 0 | 0 | 0 | 0 | 0 | 0.2 | 26.7 | 1.5 |
| 46 | Comparative Example | 0 | 0 | 0 | 0 | 0 | 0 | 0 | 0 | 0 | 0 | 0 | 0.2 | 26.7 | 1.5 |
| 47 | Comparative Example | 0 | 0 | 0 | 0 | 0 | 0 | 0 | 0 | 0 | 0 | 0 | 0.2 | 26.7 | 1.5 |
| 48 | Example | 0.05 | 0 | 0 | 0 | 0 | 0 | 0 | 0 | 0 | 0 | 0.05 | 0.4 | 15.0 | 1.3 |
| 49 | Comparative Example | 0.05 | 0 | 0 | 0 | 0 | 0 | 0 | 0 | 0 | 0 | 0.05 | 0.4 | 15.0 | 1.0 |
| 50 | Example | 0.05 | 0 | 0 | 0 | 0 | 0 | 0 | 0 | 0 | 0 | 0.05 | 0.4 | 15.0 | 1.3 |
| 51 | Comparative Example | 0.05 | 0 | 0 | 0 | 0 | 0 | 0 | 0 | 0 | 0 | 0.05 | 0.4 | 15.0 | 1.3 |
| 52 | Example | 0.05 | 0 | 0 | 0 | 0 | 0.05 | 0 | 0 | 0 | 0 | 0.10 | 0.4 | 15.0 | 2.0 |
| 53 | Comparative Example | 0.05 | 0 | 0 | 0 | 0 | 0.05 | 0 | 0 | 0 | 0 | 0.10 | 0.4 | 15.0 | 2.0 |
| 54 | Comparative Example | 0.05 | 0 | 0 | 0 | 0 | 0 | 0 | 0 | 0 | 0 | 0.05 | 0.4 | 11.3 | 1.0 |
| 55 | Comparative Example | 0 | 0 | 0 | 0 | 0 | 0 | 0 | 0 | 0 | 0 | 0 | 0 | — | 0.0 |
| 56 | Example | 0 | 0 | 0 | 0 | 0 | 0 | 0 | 0.05 | 0 | 0 | 0.05 | 0.3 | 15.0 | 3.0 |
| 57 | Comparative Example | 0 | 0 | 0 | 0 | 0 | 0 | 0 | 0.05 | 0 | 0 | 0.05 | 0.4 | 11.3 | 4.0 |
| 58 | Example | 0 | 0 | 0 | 0 | 0 | 0 | 0 | 0 | 0 | 0 | 0 | 0.03 | 500.0 | 1.0 |
| 59 | Example | 0 | 0 | 0 | 0 | 0 | 0 | 0 | 0 | 0 | 0 | 0 | 0.9 | 16.7 | 3.6 |
| 60 | Example | 0 | 0 | 0 | 0 | 0 | 0 | 0 | 0 | 0 | 0 | 0 | 1 | 15.0 | 2.0 |
| 61 | Comparative Example | 0 | 0 | 0 | 0 | 0 | 0.10 | 0 | 0 | 0 | 0 | 0.10 | 1.1 | 13.6 | 2.2 |
| 62 | Example | 0 | 0 | 0 | 0 | 0 | 0.10 | 0 | 0 | 0 | 0 | 0.10 | 0.4 | 20.0 | 2.0 |
| 63 | Comparative Example | 0 | 0 | 0 | 0 | 0 | 0 | 0 | 0 | 0 | 0 | 0 | 0.4 | 20.0 | 2.0 |
| 64 | Example | 0 | 0 | 0 | 0 | 0 | 0.10 | 0.10 | 0.10 | 0 | 0 | 0.30 | 0.3 | 26.7 | 1.5 |
| 65 | Comparative Example | 0 | 0 | 0 | 0 | 0 | 0.10 | 0.10 | 0.10 | 0 | 0 | 0.30 | 0.3 | 26.7 | 1.5 |
| 66 | Example | 0.05 | 0 | 0 | 0 | 0 | 0 | 0 | 0 | 0 | 0 | 0.05 | 0.3 | 23.3 | 1.0 |
| 67 | Comparative Example | 0.05 | 0 | 0 | 0 | 0 | 0 | 0 | 0 | 0 | 0 | 0.05 | 0.3 | 23.3 | 1.0 |
| 68 | Example | 0.05 | 0 | 0 | 0 | 0.10 | 0 | 0 | 0 | 0 | 0 | 0.15 | 0.2 | 23.3 | 1.0 |
| 69 | Comparative Example | 0.05 | 0 | 0 | 0 | 0.10 | 0 | 0 | 0 | 0 | 0 | 0.15 | 0.2 | 23.3 | 1.0 |
| 70 | Example | 0.05 | 0 | 0 | 0 | 0 | 0 | 0 | 0 | 0.10 | 0 | 0.15 | 0.75 | 15.6 | 3.0 |
| 71 | Comparative Example | 0.05 | 0 | 0 | 0 | 0 | 0 | 0 | 0 | 0.10 | 0 | 0.15 | 0.75 | 15.6 | 4.5 |
| 72 | Example | 0.05 | 0 | 0 | 0 | 0 | 0 | 0 | 0 | 0 | 0.05 | 0.10 | 0.8 | 17.5 | 4.0 |
| 73 | Comparative Example | 0 | 0 | 0 | 0 | 0 | 0 | 0 | 0 | 0 | 0.05 | 0.05 | 0.8 | 17.5 | 4.0 |
| 74 | Example | 0 | 0 | 0 | 0 | 0 | 0 | 0 | 0 | 0 | 0 | 0 | 0.7 | 18.6 | 3.5 |
| 75 | Comparative Example | 0 | 0 | 0 | 0 | 0 | 0 | 0 | 0 | 0 | 0 | 0 | 0.7 | 18.6 | 3.5 |
| 76 | Example | 0 | 0 | 0 | 0 | 0 | 0 | 0 | 0 | 0 | 0 | 0 | 0.6 | 16.7 | 3.0 |
| 77 | Comparative Example | 0 | 0 | 0 | 0 | 0 | 0 | 0 | 0 | 0 | 0 | 0 | 0.6 | 16.7 | 3.0 |

TABLE 3B-continued

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si—Sn | Mg/Si | Si/Ca |
| 78 | Comparative Example | 0.10 | 0 | 0 | 0 | 0 | 0 | 0 | 0 | 0 | 0 | 0.10 | 0.3 | 15.0 | 2.0 |
| 79 | Comparative Example | 0.10 | 0 | 0 | 0 | 0 | 0 | 0 | 0 | 0 | 0 | 0.10 | 0.3 | 15.0 | 2.0 |
| 80 | Comparative Example | 0.10 | 0 | 0 | 0 | 0 | 0 | 0 | 0 | 0 | 0 | 0.10 | 0.1 | 30.0 | 1.0 |

The underlined value indicates that the value is out of the scope of the present invention.

TABLE 3C

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si—Sn | Mg/Si | Si/Ca |
| 81 | Example | 0.45 | 0 | 0 | 0 | 0 | 0 | 0 | 0 | 0 | 0 | 0.45 | 0.1 | 30.0 | 1.0 |
| 82 | Comparative Example | 0.55 | 0 | 0 | 0 | 0 | 0 | 0 | 0 | 0 | 0 | 0.55 | 0.1 | 30.0 | 1.0 |
| 83 | Example | 0 | 0.45 | 0 | 0 | 0 | 0 | 0 | 0 | 0 | 0 | 0.45 | 0.1 | 30.0 | 1.0 |
| 84 | Comparative Example | 0 | 0.55 | 0 | 0 | 0 | 0 | 0 | 0 | 0 | 0 | 0.55 | 0 | 60.0 | 0.5 |
| 85 | Example | 0 | 0 | 0.45 | 0 | 0 | 0 | 0 | 0 | 0 | 0 | 0.45 | 0.1 | 30.0 | 1.0 |
| 86 | Comparative Example | 0 | 0 | 0.55 | 0 | 0 | 0 | 0 | 0 | 0 | 0 | 0.55 | 0 | 60.0 | 0.5 |
| 87 | Example | 0.00 | 0 | 0 | 0.45 | 0 | 0 | 0 | 0 | 0 | 0 | 0.45 | 0.6 | 15.0 | 4.0 |
| 88 | Comparative Example | 0.00 | 0 | 0 | 0.55 | 0 | 0 | 0 | 0 | 0 | 0 | 0.55 | 0.6 | 15.0 | 4.0 |
| 89 | Example | 0.00 | 0 | 0 | 0 | 0.45 | 0 | 0 | 0 | 0 | 0 | 0.45 | 0.6 | 15.0 | 4.0 |
| 90 | Comparative Example | 0.00 | 0 | 0 | 0 | 0.55 | 0 | 0 | 0 | 0 | 0 | 0.55 | 0.6 | 15.0 | 4.0 |
| 91 | Example | 0.00 | 0 | 0 | 0 | 0 | 0.45 | 0 | 0 | 0 | 0 | 0.45 | 0.3 | 22.0 | 2.5 |
| 92 | Comparative Example | 0.00 | 0 | 0 | 0 | 0 | 0.55 | 0 | 0 | 0 | 0 | 0.55 | 0.3 | 22.0 | 2.5 |
| 93 | Example | 0.00 | 0 | 0 | 0 | 0 | 0 | 0.45 | 0 | 0 | 0 | 0.45 | 0.3 | 22.0 | 2.5 |
| 94 | Comparative Example | 0.00 | 0 | 0 | 0 | 0 | 0 | 0.55 | 0 | 0 | 0 | 0.55 | 0.3 | 22.0 | 2.5 |
| 95 | Example | 0.20 | 0 | 0 | 0 | 0 | 0 | 0 | 0 | 0 | 0 | 0.20 | 0.2 | 22.5 | 2.0 |
| 96 | Comparative Example | 0.20 | 0 | 0 | 0 | 0 | 0 | 0 | 0 | 0 | 0 | 0.20 | 0.2 | 22.5 | 2.0 |
| 97 | Comparative Example | 0.10 | 0 | 0 | 0 | 0 | 0 | 0 | 0 | 0 | 0 | 0.10 | 0.2 | 22.5 | 2.0 |
| 98 | Comparative Example | 0.10 | 0 | 0 | 0 | 0 | 0 | 0 | 0 | 0 | 0 | 0.10 | 0.2 | 22.5 | 2.0 |
| 99 | Comparative Example | 0.10 | 0 | 0 | 0 | 0 | 0 | 0 | 0 | 0 | 0 | 0.10 | 0.2 | 22.5 | 2.0 |
| 100 | Comparative Example | 0.10 | 0 | 0 | 0 | 0 | 0 | 0 | 0 | 0 | 0 | 0.10 | 0.2 | 22.5 | 2.0 |
| 101 | Comparative Example | 0.10 | 0 | 0 | 0 | 0 | 0 | 0 | 0 | 0 | 0 | 0.10 | 0.2 | 22.5 | 2.0 |
| 102 | Comparative Example | 0.10 | 0 | 0 | 0 | 0 | 0 | 0 | 0 | 0 | 0 | 0.10 | 0.2 | 22.5 | 2.0 |
| 103 | Comparative Example | 0.10 | 0 | 0 | 0 | 0 | 0 | 0 | 0 | 0 | 0 | 0.10 | 0.2 | 22.5 | 2.0 |
| 104 | Comparative Example | 0.10 | 0 | 0 | 0 | 0 | 0 | 0 | 0 | 0 | 0 | 0.10 | 0.2 | 22.5 | 2.0 |
| 105 | Comparative Example | 0.10 | 0 | 0 | 0 | 0 | 0 | 0 | 0 | 0 | 0 | 0.10 | 0.2 | 22.5 | 2.0 |
| 106 | Comparative Example | 0.10 | 0 | 0 | 0 | 0 | 0 | 0 | 0 | 0 | 0 | 0.10 | 0.2 | 22.5 | 2.0 |
| 107 | Comparative Example | 0.10 | 0 | 0 | 0 | 0 | 0 | 0 | 0 | 0 | 0 | 0.10 | 0.2 | 22.5 | 2.0 |
| 108 | Comparative Example | 0.10 | 0 | 0 | 0 | 0 | 0 | 0 | 0 | 0 | 0 | 0.10 | 0.2 | 22.5 | 2.0 |
| 109 | Example | 0 | 0 | 0 | 0 | 0 | 0 | 0 | 0.45 | 0 | 0 | 0.45 | 0.1 | 30.0 | 1.5 |
| 110 | Comparative Example | 0 | 0 | 0 | 0 | 0 | 0 | 0 | 0.55 | 0 | 0 | 0.55 | 0.1 | 30.0 | 1.5 |
| 111 | Example | 0 | 0 | 0 | 0 | 0 | 0 | 0 | 0 | 0.45 | 0 | 0.45 | 0.1 | 30.0 | 1.5 |
| 112 | Comparative Example | 0 | 0 | 0 | 0 | 0 | 0 | 0 | 0 | 0.55 | 0 | 0.55 | 0.1 | 30.0 | 1.5 |
| 113 | Example | 0 | 0 | 0 | 0 | 0 | 0 | 0 | 0 | 0 | 0.45 | 0.45 | 0.1 | 30.0 | 1.5 |

TABLE 3C-continued

| | | Chemical composition of plating layer (mass %) Remainder: Zn and impurities Element group D | | | | | | | | | | Formula 1 | Formula 2 | Formula 3 |
|---|---|---|---|---|---|---|---|---|---|---|---|---|---|---|
| No. | Category | Sr | Sb | Pb | B | Li | Zr | Mo | W | Ag | P | ΣD | Si—Sn | Mg/Si | Si/Ca |
| 114 | Comparative Example | 0 | 0 | 0 | 0 | 0 | 0 | 0 | 0 | 0 | 0.55 | 0.55 | 0.1 | 30.0 | 1.5 |
| 115 | Comparative Example | 0 | 0 | 0 | 0 | 0 | 0 | 0 | 0 | 0 | 0 | 0 | 0.1 | 30.0 | 1.5 |
| 116 | Comparative Example | 0 | 0 | 0 | 0 | 0 | 0 | 0 | 0 | 0 | 0 | 0 | −0.07 | 300.0 | 1.0 |

The underlined value indicates that the value is out of the scope of the present invention.

TABLE 4A

| | | X-ray diffraction | | | | Corrosion resistance in water | |
|---|---|---|---|---|---|---|---|
| | | | | | | Simulated | Salt |
| No. | Category | I1 | I2 | I3 | I4 | acid rain | water |
| 1 | Comparative Example | 1.02 | 0.26 | 0.08 | 1.2 | E | E |
| 2 | Example | 2.20 | 0.20 | 0.03 | 1.3 | A | A |
| 3 | Example | 2.10 | 0.17 | 0.08 | 1.01 | B | B |
| 4 | Example | 2.20 | 0.18 | 0.08 | 1.01 | C | B |
| 5 | Example | 2.10 | 0.12 | 0.03 | 1.1 | B | A |
| 6 | Example | 2.20 | 0.11 | 0.03 | 1.2 | B | A |
| 7 | Example | 2.30 | 0.11 | 0.07 | 1.3 | B | A |
| 8 | Comparative Example | 1.02 | 0.30 | 0.07 | 1.3 | E | E |
| 9 | Comparative Example | 1.03 | 0.30 | 0.1 | 1.02 | E | E |
| 10 | Example | 2.40 | 0.15 | 0.02 | 1.02 | C | B |
| 11 | Example | 2.30 | 0.03 | 0.07 | 1.3 | S | S |
| 12 | Example | 2.20 | 0.01 | 0.07 | 1.3 | S | S |
| 13 | Example | 2.30 | 0.01 | 0.01 | 1.02 | A | A |
| 14 | Comparative Example | 1.03 | 0.27 | 0.12 | 1.01 | E | E |
| 15 | Example | 2.20 | 0.01 | 0.01 | 1.1 | A | S |
| 16 | Example | 2.10 | 0.01 | 0.02 | 1.3 | A | S |
| 17 | Comparative Example | 1.01 | 0.27 | 0.07 | 1.3 | E | E |
| 18 | Example | 2.10 | 0.13 | 0.06 | 1.4 | A | B |
| 19 | Comparative Example | 1.01 | 0.27 | 0.1 | 1.01 | E | E |
| 20 | Example | 2.10 | 0.13 | 0.02 | 1.01 | C | C |
| 21 | Comparative Example | 1.01 | 0.27 | 0.04 | 1.3 | E | E |
| 22 | Example | 2.20 | 0.13 | 0.04 | 1.3 | A | B |
| 23 | Example | 2.30 | 0.03 | 0.02 | 1.01 | B | A |
| 24 | Comparative Example | 1.01 | 0.26 | 0.12 | 1.01 | E | E |
| 25 | Comparative Example | 1.01 | 0.28 | 0.11 | 1.5 | E | E |
| 26 | Example | 2.20 | 0.12 | 0.03 | 1.3 | A | A |
| 27 | Example | 2.20 | 0.12 | 0.06 | 1.2 | A | A |
| 28 | Example | 2.30 | 0.12 | 0.06 | 1.3 | A | B |
| 29 | Example | 2.30 | 0.12 | 0.08 | 1.02 | B | C |
| 30 | Example | 2.30 | 0.01 | 0.08 | 1.02 | A | B |
| 31 | Example | 2.30 | 0.01 | 0.01 | 1.1 | A | A |
| 32 | Comparative Example | 1.02 | 0.28 | 0.08 | 1.2 | E | E |
| 33 | Comparative Example | 1.03 | 0.28 | 0.17 | 1.01 | E | E |
| 34 | Example | 2.20 | 0.03 | 0.01 | 1.3 | S | A |
| 35 | Comparative Example | 1.02 | 0.29 | 0.05 | 1.3 | E | E |
| 36 | Comparative Example | 1.02 | 0.30 | 0.05 | 1.2 | E | E |
| 37 | Comparative Example | 1.02 | 0.30 | 0.06 | 1.3 | E | E |
| 38 | Comparative Example | 1.03 | 0.31 | 0.26 | 1.01 | E | E |
| 39 | Comparative Example | 1.02 | 0.30 | 0.23 | 1.01 | E | E |
| 40 | Comparative Example | 1.02 | 0.29 | 0.22 | 1.01 | E | E |

The underlined value indicates that the value is out of the scope of the present invention.

TABLE 4B

| | | X-ray diffraction | | | | Corrosion resistance in water | |
|---|---|---|---|---|---|---|---|
| | | | | | | Simulated | Salt |
| No. | Category | I1 | I2 | I3 | I4 | acid rain | water |
| 41 | Comparative Example | 1.02 | 0.30 | 0.21 | 1.3 | E | E |
| 42 | Comparative Example | 1.02 | 0.31 | 0.23 | 1.2 | E | E |
| 43 | Comparative Example | 1.03 | 0.29 | 0.23 | 1.1 | E | E |
| 44 | Comparative Example | 1.02 | 0.28 | 0.23 | 1.1 | E | E |
| 45 | Comparative Example | 1.02 | 0.27 | 0.21 | 1.3 | E | E |
| 46 | Comparative Example | 1.02 | 0.26 | 0.23 | 1.2 | E | E |
| 47 | Comparative Example | 1.03 | 0.28 | 0.24 | 1.3 | E | E |
| 48 | Example | 2.10 | 0.03 | 0.01 | 1.01 | C | B |
| 49 | Comparative Example | 1.02 | 0.27 | 0.1 | 1.3 | E | E |
| 50 | Example | 2.20 | 0.03 | 0.14 | 1.01 | C | C |
| 51 | Comparative Example | 1.02 | 0.28 | 0.13 | 1.01 | E | E |
| 52 | Example | 2.10 | 0.03 | 0.12 | 1.01 | C | C |
| 53 | Comparative Example | 1.03 | 0.28 | 0.09 | 1.1 | E | E |
| 54 | Comparative Example | 1.02 | 0.28 | 0.08 | 1.2 | E | E |
| 55 | Comparative Example | 1.02 | 0.28 | 0.12 | 1.3 | E | E |
| 56 | Example | 2.20 | 0.11 | 0.12 | 1.1 | C | D |
| 57 | Comparative Example | 1.03 | 0.27 | 0.05 | 1.01 | E | E |
| 58 | Example | 2.40 | 0.01 | 0.02 | 1.01 | A | C |
| 59 | Example | 1.40 | 0.01 | 0.24 | 1.3 | B | B |
| 60 | Example | 1.40 | 0.01 | 0.23 | 1.2 | B | B |
| 61 | Comparative Example | 1.02 | 0.33 | 0.1 | 1.1 | E | E |
| 62 | Example | 2.30 | 0.13 | 0.08 | 1.3 | B | B |

TABLE 4B-continued

| No. | Category | I1 | I2 | I3 | I4 | Simulated acid rain | Salt water |
|---|---|---|---|---|---|---|---|
| 63 | Comparative Example | 1.02 | 0.33 | 0.08 | 1.01 | E | E |
| 64 | Example | 2.20 | 0.13 | 0.03 | 1.02 | C | C |
| 65 | Comparative Example | 1.02 | 0.31 | 0.05 | 1.3 | E | E |
| 66 | Example | 2.20 | 0.13 | 0.02 | 1.2 | C | B |
| 67 | Comparative Example | 1.02 | 0.31 | 0.21 | 1.3 | E | E |
| 68 | Example | 1.10 | 0.13 | 0.21 | 1.1 | B | B |
| 69 | Comparative Example | 1.03 | 0.31 | 0.09 | 1.02 | E | E |
| 70 | Example | 2.00 | 0.01 | 0.02 | 1.01 | C | B |
| 71 | Comparative Example | 1.01 | 0.30 | 0.1 | 1.1 | E | E |
| 72 | Example | 2.20 | 0.01 | 0.11 | 1.3 | C | A |
| 73 | Comparative Example | 1.02 | 0.26 | 0.14 | 1.01 | E | E |
| 74 | Example | 2.10 | 0.01 | 0.01 | 1.02 | D | C |
| 75 | Comparative Example | 1.03 | 0.27 | 0.22 | 1.1 | E | E |
| 76 | Example | 1.80 | 0.01 | 0.22 | 1.3 | C | B |
| 77 | Comparative Example | 1.05 | 0.27 | 0.21 | 1.2 | E | E |
| 78 | Comparative Example | 1.09 | 0.27 | 0.21 | 1.1 | E | E |
| 79 | Comparative Example | 1.02 | 0.27 | 0.1 | 1.01 | E | E |
| 80 | Comparative Example | 1.03 | 0.27 | 0.1 | 1.02 | E | E |

The underlined value indicates that the value is out of the scope of the present invention.

TABLE 4C

| No. | Category | I1 | I2 | I3 | I4 | Simulated acid rain | Salt water |
|---|---|---|---|---|---|---|---|
| 81 | Example | 2.30 | 0.11 | 0.01 | 1.1 | B | B |
| 82 | Comparative Example | 1.04 | 0.28 | 0.06 | 1.1 | E | E |
| 83 | Example | 1.80 | 0.11 | 0.23 | 1.02 | C | C |
| 84 | Comparative Example | 1.03 | 0.28 | 0.23 | 1.02 | E | E |
| 85 | Example | 1.60 | 0.11 | 0.23 | 1.3 | B | C |
| 86 | Comparative Example | 1.02 | 0.27 | 0.23 | 1.1 | E | E |
| 87 | Example | 2.10 | 0.01 | 0.01 | 1.1 | B | B |
| 88 | Comparative Example | 1.03 | 0.26 | 0.07 | 1.3 | E | E |
| 89 | Example | 1.70 | 0.01 | 0.21 | 1.01 | C | B |
| 90 | Comparative Example | 1.02 | 0.26 | 0.21 | 1.01 | E | E |
| 91 | Example | 1.50 | 0.01 | 0.21 | 1.2 | A | A |
| 92 | Comparative Example | 1.03 | 0.26 | 0.21 | 1.3 | E | E |
| 93 | Example | 2.30 | 0.01 | 0.01 | 1.01 | B | B |
| 94 | Comparative Example | 1.02 | 0.28 | 0.06 | 1.02 | E | E |
| 95 | Example | 2.20 | 0.01 | 0.02 | 1.3 | A | A |
| 96 | Comparative Example | 1.02 | 0.27 | 0.04 | 1.2 | E | E |
| 97 | Comparative Example | 1.02 | 0.29 | 0.06 | 1.1 | E | E |
| 98 | Comparative Example | 1.02 | 0.27 | 0.09 | 1.1 | E | E |
| 99 | Comparative Example | 1.03 | 0.30 | 0.23 | 1.01 | E | E |
| 100 | Comparative Example | 1.02 | 0.30 | 0.21 | 1.01 | E | E |
| 101 | Comparative Example | 1.02 | 0.27 | 0.22 | 1.02 | E | E |
| 102 | Comparative Example | 1.03 | 0.27 | 0.23 | 1.3 | E | E |
| 103 | Comparative Example | 1.03 | 0.27 | 0.23 | 1.2 | E | E |
| 104 | Comparative Example | 1.02 | 0.28 | 0.23 | 1.1 | E | E |
| 105 | Comparative Example | 1.02 | 0.28 | 0.23 | 1.3 | E | E |
| 106 | Comparative Example | 1.04 | 0.28 | 0.23 | 1.1 | E | E |
| 107 | Comparative Example | 1.03 | 0.26 | 0.21 | 1.1 | E | E |
| 108 | Comparative Example | 1.01 | 0.28 | 0.21 | 1.3 | E | E |
| 109 | Example | 2.20 | 0.01 | 0.01 | 1.1 | A | B |
| 110 | Comparative Example | 1.02 | 0.30 | 0.07 | 1.3 | E | E |
| 111 | Example | 1.20 | 0.01 | 0.23 | 1.3 | A | A |
| 112 | Comparative Example | 1.02 | 0.28 | 0.21 | 1.1 | E | E |
| 113 | Example | 1.30 | 0.01 | 0.23 | 1.01 | B | B |
| 114 | Comparative Example | 1.03 | 0.27 | 0.21 | 1.01 | E | E |
| 115 | Comparative Example | 1.01 | 0.02 | 0.02 | 1.1 | E | E |
| 116 | Comparative Example | 1.02 | 0.02 | 0.02 | 1.2 | E | E |

The underlined value indicates that the value is out of the scope of the present invention.

TABLE 5

| Original sheet conditions | Original sheet | Thickness of ZnFe alloy layer (μm) | Zn-Fe alloy layer ratio ζ phase | δ phase | Γ · Γ1 phase |
|---|---|---|---|---|---|
| A1 | Zn plating 300 to 400 g/m² | 30 | 0.80 | 0.18 | 0.02 |
| A2 | | | 0.75 | 0.20 | 0.05 |
| A3 | | | 0.70 | 0.21 | 0.09 |
| B1 | Zn plating 400 to 500 g/m² | 50 | 0.80 | 0.18 | 0.02 |
| B2 | | | 0.75 | 0.20 | 0.05 |
| B3 | | | 0.70 | 0.21 | 0.09 |
| C1 | Zn plating 500 to 700 g/m2 | 60 | 0.80 | 0.18 | 0.02 |
| C2 | | | 0.75 | 0.20 | 0.05 |
| C3 | | | 0.70 | 0.21 | 0.09 |

(*) The Zn-Fe alloy layer ratio indicates a ratio of each phase when the total thickness of Zn-Fe alloy layer is 1.

TABLE 6

| Plating conditions | Immersion time (second) | Cooling time up to 450° C. (second) | Invasion/pull-up speed cm/second |
|---|---|---|---|
| D1 | 2 | 5 | 10 |
| D2 | 3 | | |
| D3 | 10 | | |
| D4 | 18 | | |
| D5 | 20 | | |
| D6 | 60 | | |
| E1 | 2 | 7 | |
| E2 | 3 | | |

TABLE 6-continued

| Plating conditions | Immersion time (second) | Cooling time up to 450° C. (second) | Invasion/ pull-up speed cm/second |
|---|---|---|---|
| E3 | 10 | | |
| E4 | 18 | | |
| E5 | 20 | | |
| E6 | 60 | | |

TABLE 7

| Air bubbling | |
|---|---|
| F1 | Performed |
| F2 | Not performed |

FIELD OF INDUSTRIAL APPLICATION

The present invention can provide a hot-dip plated steel material capable of exhibiting high corrosion resistance in water (in simulated acid rain or salt water such as seawater) or under a constant water wetted environment in which water wetting may occur, and therefore has high industrial applicability.

The invention claimed is:

1. A hot-dip plated steel material that is a plated steel material comprising a plating layer on a surface of a steel material, wherein
the plating layer has an average chemical composition including, in mass %,
Al: more than 22.5% and 50.0% or less,
Mg: more than 3.0% and 15.0% or less,
Sn: 0% or more and 0.7% or less,
Bi: 0% or more and 0.3% or less,
In: 0% or more and 0.3% or less,
Ca: 0.03% or more and 0.6% or less,
Y: 0% or more and 0.30% or less,
La: 0% or more and 0.30% or less,
Ce: 0% or more and 0.30% or less,
Si: 0.03% or more and 1.0% or less,
Cr: 0% or more and 0.25% or less,
Ti: 0% or more and 0.25% or less,
Ni: 0% or more and 0.25% or less,
Co: 0% or more and 0.25% or less,
V: 0% or more and 0.25% or less,
Nb: 0% or more and 0.25% or less,
Cu: 0% or more and 0.25% or less,
Mn: 0% or more and 0.25% or less,
Fe: 2.0% or more and 25% or less,
Sr: 0% or more and 0.50% or less,
Sb: 0% or more and 0.50% or less,
Pb: 0% or more and 0.50% or less,
B: 0% or more and 0.50% or less,
Li: 0% or more and 0.50% or less,
Zr: 0% or more and 0.50% or less,
Mo: 0% or more and 0.50% or less,
W: 0% or more and 0.50% or less,
Ag: 0% or more and 0.50% or less,
P: 0% or more and 0.50% or less, and
a remainder consisting of Zn and impurities,
a total amount $\Sigma A$ of Sn, Bi, and In is 0% or more and 0.7% or less,
a total amount $\Sigma B$ of Ca, Y, La, and Ce is 0.03% or more and 0.60% or less,
a total amount $\Sigma C$ of Cr, Ti, Ni, Co, V, Nb, Cu, and Mn is 0% or more and 0.25% or less,
a total amount $\Sigma D$ of Sr, Sb, Pb, B, Li, Zr, Mo, W, Ag, and P is 0% or more and 0.50% or less,
following formulas (1) to (3) are satisfied,
in an X-ray diffraction pattern of a surface of the plating layer, measured under conditions in which an X-ray output is a voltage of 50 kV and a current of 300 mA using a Cu-Kα ray, when $I_1$ obtained from an X-ray diffraction peak of $Al_{0.5}Fe_{1.5}$ is defined by formula (A-1), formula (A-2) is satisfied, and
when $I_2$ obtained from X-ray diffraction peaks of Zn, Al, and $MgZn_2$ is defined by formula (B-1), formula (B-2) is satisfied, $$Sn \leq Si \quad (1)$$

$$15 \leq Mg/Si \quad (2)$$

$$1.0 \leq Si/Ca \leq 5.0 \quad (3)$$

[Mathematical Formula 1]

$$I_1 = \frac{I\max(43.45 \sim 44.45°)}{I(43.45) + 0.5\{|I(43.45°) - I(44.45°)|\}} \quad (A-1)$$

$$1.10 \leq I_1 \quad (A-2)$$

$$I_2 = \frac{I\max(36.00 \sim 36.60°)}{I\max(36.00 \sim 36.60°) + I\max(38.00 \sim 39.00°) + I\max(19.20 \sim 20.00°)} \quad (B-1)$$

$$I_2 \leq 0.25 \quad (B-2)$$

provided that, in formulas (1) to (3), Sn, Si, Mg, and Ca represent contents (mass %) of respective elements in the plating layer, Imax (k to m°) in formulas (A-1) and (B-1) represents an absolute maximum value of an X-ray diffraction intensity between a diffraction angle of k° and a diffraction angle of m°, Imax (n°) in formula (A-1) represents an X-ray diffraction intensity at a diffraction angle of n°, and k, m, and n each represent a diffraction angle indicated in formulas (A-1) and (B-1).

2. The hot-dip plated steel material according to claim 1, wherein in an X-ray diffraction pattern of a surface of the plating layer, measured under conditions in which an X-ray output is a voltage of 50 kV and a current of 300 mA using a Cu-Kα ray, when 13 obtained from an X-ray diffraction peak of $MgZn_2$ is defined by formula (C-1), formula (C-2) is satisfied;

[Mathematical Formula 2]

$$I_3 = \frac{I\max(28.52 \sim 28.92°)}{\{I\max(19.20 \sim 20.00°) + I\max(20.58 \sim 20.98°) + I\max(22.06 \sim 22.46°) + I\max(28.52 \sim 28.92°)\}} \quad (C-1)$$

$$I_3 \leq 0.03 \quad (C-2)$$

provided that Imax (k to m°) in formula (C-1) represents an absolute maximum value of an X-ray diffraction intensity between a diffraction angle of k° and a diffraction angle of m°, and k and m each represent a diffraction angle indicated in formula (C-1).

3. The hot-dip plated steel material according to claim 1, wherein in an X-ray diffraction pattern of a surface of the plating layer, measured under conditions in which an X-ray output is a voltage of 50 kV and a current of 300 mA using a Cu-Kα ray, when $I_4$ obtained from an X-ray diffraction peak of Ca(Al$_2$Si$_2$)O$_8$ is defined by formula (D-1), formula (D-2) is satisfied;

[Mathematical Formula 3]

$$I_4 = \frac{I\max(22.91 \sim 23.91°)}{I(22.91°) + 0.5\{|I(22.91°) - I(23.91°)|\}} \quad \text{(D-1)}$$

$$1.1 \leq I_4 \quad \text{(D-2)}$$

provided that Imax (k to m°) in formula (D-1) represents an absolute maximum value of an X-ray diffraction intensity between a diffraction angle of k° and a diffraction angle of m°, Imax (n°) represents an X-ray diffraction intensity at a diffraction angle of n°, and k, m, and n each represent a diffraction angle indicated in formula (D-1).

4. The hot-dip plated steel material according to claim 2, wherein in an X-ray diffraction pattern of a surface of the plating layer, measured under conditions in which an X-ray output is a voltage of 50 kV and a current of 300 mA using a Cu-Kα ray, when 14 obtained from an X-ray diffraction peak of Ca(Al$_2$Si$_2$)O$_8$ is defined by formula (D-1), formula (D-2) is satisfied;

[Mathematical Formula 3]

$$I_4 = \frac{I\max(22.91 \sim 23.91°)}{I(22.91°) + 0.5\{|I(22.91°) - I(23.91°)|\}} \quad \text{(D-1)}$$

$$1.1 \leq I_4 \quad \text{(D-2)}$$

provided that Imax (k to m°) in formula (D-1) represents an absolute maximum value of an X-ray diffraction intensity between a diffraction angle of k° and a diffraction angle of m°, Imax (n°) represents an X-ray diffraction intensity at a diffraction angle of n°, and k, m, and n each represent a diffraction angle indicated in formula (D-1).

* * * * *